United States Patent
Hoare et al.

(10) Patent No.: US 9,399,473 B2
(45) Date of Patent: Jul. 26, 2016

(54) WADE SENSING DISPLAY CONTROL SYSTEM

(71) Applicant: Jaguar Land Rover Limited, Whitley Coventry Warwickshire (GB)

(72) Inventors: Edward Hoare, Malvern (GB); Jonathan Woodley, Warwick (GB); Thuy-Yung Tran, Rugby (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/389,501

(22) PCT Filed: Mar. 27, 2013

(86) PCT No.: PCT/EP2013/056605
§ 371 (c)(1),
(2) Date: Sep. 30, 2014

(87) PCT Pub. No.: WO2013/144252
PCT Pub. Date: Oct. 3, 2013

(65) Prior Publication Data
US 2015/0066339 A1    Mar. 5, 2015

(30) Foreign Application Priority Data
Mar. 30, 2012    (GB) .................................... 1205653.7

(51) Int. Cl.
*G06F 19/00*    (2011.01)
*B60W 50/14*    (2012.01)
*B60G 17/019*    (2006.01)
*G01F 23/00*    (2006.01)
(Continued)

(52) U.S. Cl.
CPC ............. *B60W 50/14* (2013.01); *B60G 17/019* (2013.01); *B60G 17/0165* (2013.01); *B60K 35/00* (2013.01); *B60Q 1/00* (2013.01); *B60W 40/06* (2013.01); *G01F 23/0076* (2013.01); *G01F 23/2962* (2013.01); *G01F 23/2965* (2013.01); *B60G 2300/07* (2013.01); *B60G 2400/80* (2013.01); *B60G 2600/04* (2013.01); *B60K 2350/1076* (2013.01); *B60W 2050/146* (2013.01)

(58) Field of Classification Search
CPC B60W 40/06; B60W 50/14; B60W 2050/146
See application file for complete search history.

(56) References Cited

U.S. PATENT DOCUMENTS

2009/0159020 A1    6/2009    Hall et al.
2010/0112387 A1    5/2010    Nagasawa
(Continued)

FOREIGN PATENT DOCUMENTS

DE    19941126    4/2001
GB    2356602    5/2001
(Continued)

OTHER PUBLICATIONS

International Search Report for application No. PCT/EP2013/056605, dated Jul. 19, 2013, 6 pages.
(Continued)

*Primary Examiner* — Michael D Lang
(74) *Attorney, Agent, or Firm* — Reising Ethington P.C.

(57) ABSTRACT

A method of controlling an HMI-apparatus for providing information comprising comparing data from two or more remote-ranging sensors disposed at an elevation greater than the threshold wading depth of the vehicle.

21 Claims, 10 Drawing Sheets

(51) Int. Cl.
*G01F 23/296* (2006.01)
*B60G 17/0165* (2006.01)
*B60W 40/06* (2012.01)
*B60K 35/00* (2006.01)
*B60Q 1/00* (2006.01)

(56) References Cited

U.S. PATENT DOCUMENTS

2013/0307679 A1  11/2013  Tran et al.
2013/0336090 A1  12/2013  Tran et al.
2014/0085066 A1   3/2014  Tran et al.
2014/0156126 A1   6/2014  Tran et al.
2014/0184247 A1   7/2014  Tran et al.

FOREIGN PATENT DOCUMENTS

| | | | |
|---|---|---|---|
| GB | 2376929 | 12/2002 | |
| GB | 2486789 | 6/2012 | |
| GB | 2486957 | 7/2012 | |
| GB | 2489561 | * 10/2012 | ............ B60F 3/00 |
| GB | 2496051 | 5/2013 | |
| WO | WO2009013606 | 1/2009 | |

OTHER PUBLICATIONS

UK Combined Search and Examination Report for corresponding application No. GB1205653.7, dated Jul. 11, 2012, 8 pages.
Written Opinion for application No. PCT/EP2013/056605, dated Jul. 19, 2013, 8 pages.

* cited by examiner

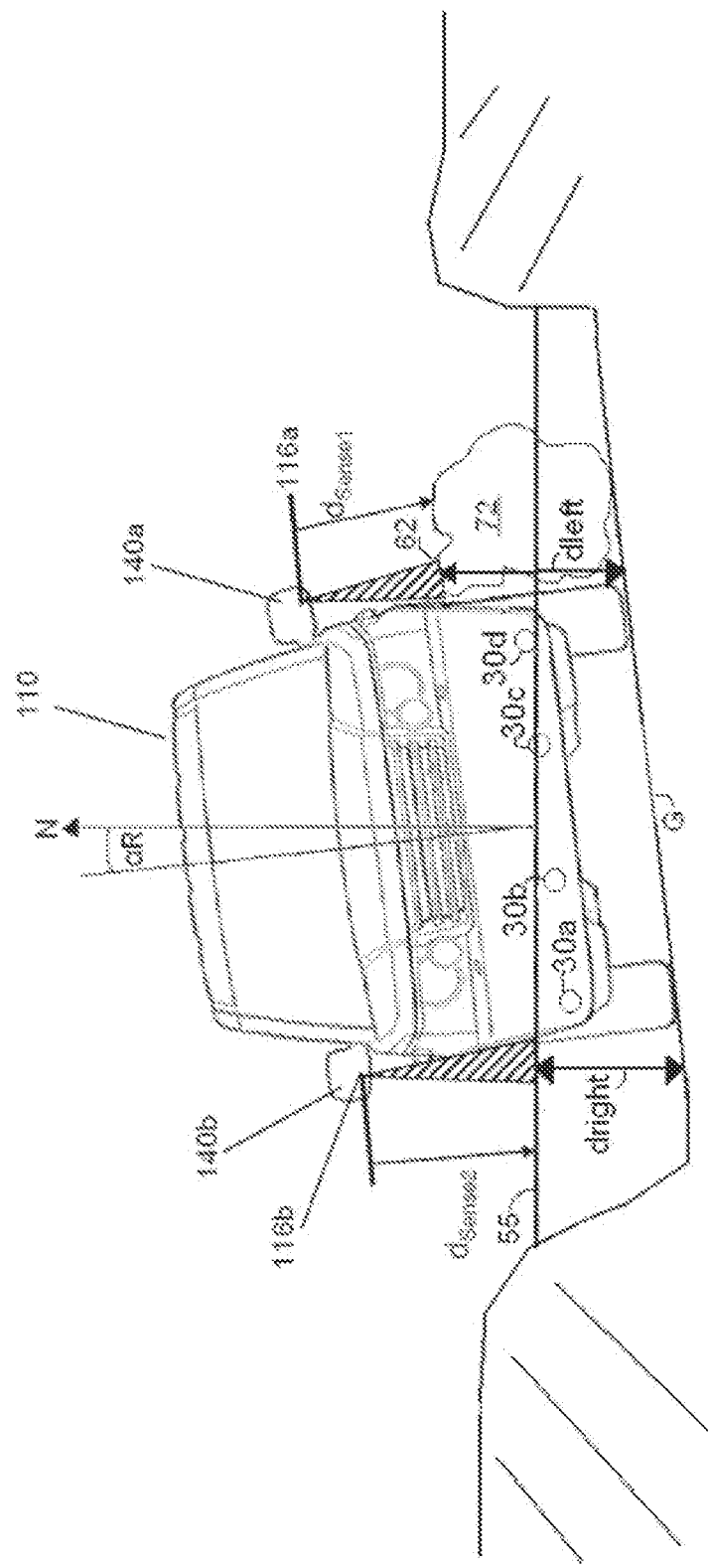

WADE SENSING DISPLAY CONTROL SYSTEM

FIELD OF THE INVENTION

The present invention relates to an in-vehicle HMI (human-machine-interface) apparatus for providing information about wading, more specifically, but not exclusively, to a control system for such an apparatus. Yet more specifically, but not exclusively, the invention relates to a control system, an algorithm and a method for selectively providing wading information on the HMI apparatus. Aspects of the invention relate to an apparatus, to a system, to a vehicle, to a method and to a computer program.

BACKGROUND

It is common for off-road vehicles to drive through a body of water and this is often referred to as a wading event. Driver caution and judgement is required when navigating a vehicle through a body of water at wading depth. This is because a vehicle driver does not generally know the depth of water the vehicle is about to enter or the nature of the terrain below the water surface. This is particularly so in low visibility conditions (dirty water, low-light, heavy rain, fog). It is recommended that a survey of the terrain is taken by wading through water on foot, but factors such as, the variability of the terrain; low visibility conditions; inconvenience to the driver; and driver impatience may result in a driver attempting to traverse water without knowledge of the water depth and therefore without being able to taking appropriate precautions.

The present applicant has submitted a series of patent applications relating to the detection of a body of water using one or more sensors mounted externally on the vehicle. Such sensors include: ultrasonic transducer sensors, capacitive sensors, resistive sensors and hydrostatic sensors capable of issuing data to a control system indicative of the presence of water about the sensor and/or a range to the surface of the water about the vehicle and/or the depth of water about the vehicle.

For example, in PCT/EP2011/072997 (incorporated herein by reference), also to the present applicant, a system is disclosed that upon detecting wading by means of a sensor, (such as that described in PCT/EP2011/072998 (incorporated herein by reference) and PCT/EP2011/072999 (incorporated herein by reference)), a downwardly facing ultrasound transducer is used to estimate a wading depth (D) of the water in which at least a portion of the vehicle is known to be disposed.

The data obtained by such sensors is intended to inform and assist a driver of the vehicle as the driver navigates the vehicle into, through and out of a body of water. In PCT/EP2011/072992 (incorporated herein by reference), PCT/EP2011/072994 (incorporated herein by reference), and PCT/EP2011/072996 (incorporated herein by reference), to the present applicant, a human machine interface (HMI) for displaying information relating to maximum wading depth, water level relative to a vehicle body, and an advisory speed for the vehicle given the conditions are respectively disclosed.

It has been recognised by the present applicant however that data obtained by sensors mounted to a vehicle may lead to a mis-interpretation or mis-representation of the true vehicle scenario. For example, a resistive or capactitive sensor may issue data indicative of the vehicle being disposed in a body of water and such data may be used to activate an in-cabin HMI to alert the driver to the vehicle being in a wading event. In fact, the vehicle may have been travelling along an un-even off-road surface and the water detected was merely a localised puddle in a rut or a splash from a puddle.

In a further example, a submersion ultrasonic transducer sensor may issue data relating to its settling time that is indicative of the vehicle being disposed in a body of water; and a surface ranging ultrasonic transducer sensor mounted to a vehicle upperbody may issue data at the same time relating to the presence of a surface intermediate the surface ranging sensor position and a ground level. An interpretation of this data is that water is disposed about the vehicle at the height of the detected surface. However, the detected surface may in fact be a bush positioned between the ground level and the surface ranging ultrasonic transducer sensor and above the water level. Activating an HMI on the basis of such an interpretation and/or presenting such depth information to the driver on an HMI may be distracting and as such disadvantageous.

There are many and various scenarios in which the data obtained from vehicle body mounted wading sensors can be mis-interpreted and could lead to an inappropriate, inaccurate, unhelpful and/or unexpected activation or termination of an HMI-apparatus.

The present invention seeks to provide a further improvement for land-based vehicles, which may travel through water, by providing an in-vehicle HMI (human-machine-interface) apparatus for providing information about wading. More specifically, but not exclusively, to a control system, an algorithm and a method for determining, inter alia: when to activate the HMI apparatus, when to deactivate the HMI apparatus and/or what information should be displayed by the HMI apparatus.

SUMMARY

Aspects of the invention provide an HMI apparatus, a system, a vehicle, a program, an algorithm and a method as claimed in the appended claims.

According to one aspect of the invention for which protection is sought, there is provided a method of controlling an HMI-apparatus, the HMI-apparatus for providing information to the driver of a vehicle, the method comprising:
  (i) comparing data from two or more remote-ranging sensors, which two or more remote ranging sensors are disposed on the same lateral axis of the vehicle and are disposed at an elevation greater than the threshold wading depth of the vehicle.

Optionally the method may comprise the additional step of (ii) determining whether at least part of the vehicle is disposed in water at a threshold wading depth of the vehicle based upon data provided by one or more water-contact sensors and wherein said additional step is carried out before or after said step of comparing data.

Additionally, said data from two or more remote ranging sensors may be left-side depth (Dleft) estimation and right-side depth (Dright) estimation.

Optionally, the step of comparing data from two or more remote-ranging sensors may comprise any one or a combination of:
  (iii) comparing a left-side depth estimation and/or a right-side depth estimation to a threshold wading depth to determine if the left-side depth estimation and/or right-side depth estimation is greater than the threshold wading depth when it has been determined that water is present at least at a threshold wading depth by any of said one or more water-contact sensors;
  (iv) comparing a left-side depth estimation and/or a right-side depth estimation to a threshold wading depth to determine if the left-side depth estimation and/or right-side depth estimation is greater than the threshold wading depth when it has not been determined that water is present at least at a threshold wading depth by any of said one or more water-contact sensors;

(v) comparing a left-side depth estimation and/or a right-side depth estimation to a low-calibrateable-range to determine if the left-side depth estimation and/or right-side depth estimation is within the low-calibrateable-range; and (vi) comparing a left-side depth estimation to a right-side depth estimation to determine if the left-side depth estimation and right-side depth estimation are within a predetermined tolerance (ΔT) of one another.

Optionally, upon determining at step (iii) that neither the left-side depth nor the right-side depth estimation is greater than a threshold wading depth, an HMI-apparatus is controlled to not be activated.

Further optionally, upon determining at step (iv) that either the left-side depth or right-side depth is greater than a threshold wading depth and at the same time no contact sensor has issued data indicating that water is present at a threshold wading depth, an HMI-apparatus is controlled to not be activated.

Yet even further optionally, upon determining at step (v) that both the left-side depth and the right-side depth are below a lower limit of the low-calibrateable range, an HMI-apparatus is controlled to not be activated.

Additionally or alternatively, upon determining at step (vi) that the left-side depth estimation and right-side depth estimation are within a predetermined tolerance (ΔT) of one another, the method further comprises checking the lateral gradient of the vehicle and if the lateral gradient is non-zero, an HMI-apparatus is controlled to not be activated. In some optional embodiments, the mounting height of the two or more remote-ranging sensors may be different, but upon deriving an estimated depth from the target range data obtained from such sensors, this difference will be accounted for and the comparison of the left-side depth and right side depth will be useful to determine whether a substantially level surface has been detected.

Optionally, upon determining at step (vi) that the left-side depth estimation and right-side depth estimation are not within a predetermined tolerance (ΔT) of one another, the method further comprises checking the lateral gradient of the vehicle and if the lateral gradient is zero, an HMI-apparatus is controlled to not be activated or if activated, is controlled to show only the depth information corresponding to the remote ranging sensor angled with the lateral gradient.

Optionally, the threshold wading depth may be between about 200 mm and about 450 mm.

Optionally, the low-calibrateable-range may be between about 125 mm and about 450 mm.

Optionally, the predetermined tolerance (ΔT) may be between about 50 mm and about 150 mm.

According to another aspect of the invention, for which protection is sought, there is provided a method of controlling an HMI-apparatus, the HMI-apparatus for providing information, the method comprising:

(i) determining if a threshold vehicle speed has been exceeded;

(ii) determining if any of one or more contact-water sensors has not detected water at threshold wading depth within a first predetermined time period;

(iii) determining if a vehicle is driving up-hill;

(iv) determining if the depth of a body of water about the vehicle has reduced to a minimum depth;

(v) determining if a user has requested manual deactivation of the HMI-apparatus; and in response to making any one or more of the above determinations (i) to (iv) the HMI-apparatus is controlled to be deactivated.

Optionally, the first predetermined time period is at least 15 seconds and the threshold wading depth is between about 200 mm and about 450 mm.

Optionally, the minimum depth is less than the threshold wading depth.

Alternatively or additionally, the threshold wading depth is about 450 mm and the minimum depth is about 350 mm.

According to another aspect of the invention, there is provided a system for wade-assisting, the system comprising: two or more remote ranging sensors disposed at an elevation above a wading depth threshold of the vehicle; an HMI apparatus configured to display wading information; and a control means arranged to compare range data from the two or more remote ranging sensors and to operate the HMI apparatus to selectively provide the wading information in dependence on the comparison. The control means is preferably a controller and is more preferably an electronic control unit of the vehicle.

The system optionally further comprises at least one water-contact sensor disposed at or below the wading depth threshold, wherein the control means is further arranged to determining if the at least one water-contact sensor is disposed in water and to further selectively provide the wading information in dependence on the determination.

Optionally the two or more remote ranging sensors are disposed on the same lateral axis of the vehicle.

The system may further comprise a vehicle attitude sensor, wherein the control means is further arranged to detect the attitude of the vehicle from the vehicle attitude sensor and to further selectively provide the wading information in dependence on the detection.

According to a further aspect of the invention for which protection is sought, there is provided a vehicle comprising a system for wade-assisting, the system comprising two or more remote ranging sensors disposed at an elevation above a wading depth threshold of the vehicle; at least one water-contact sensor disposed at an elevation optionally of a wading depth threshold; an HMI-apparatus and a control unit coupled to each of the two or more remote ranging sensors, to the at least one water-contact sensor and to the HMI-apparatus, wherein the control unit is configured to carry out the method of any of the relevant preceding paragraphs.

According to yet a further aspect of the invention for which protection is sought, there is provided a program for a computer, which when running on a computer is configured to carry out the method of any of the relevant preceding paragraphs.

In this specification, the term wading relates to travel of a land-based vehicle through water of a depth that is sufficient to require that the vehicle driver take appropriate precautions. To distinguish a wading event from a vehicle driving through a shallow puddle, in some situations wading depth may be defined as water of 200 mm or more in depth. In some situations water at a level of the front or rear wheels hubs may be indicative of a vehicle in water at wading depth. In some situations wading depth may be defined as the point at which a water contact sensor is immersed in water. However, the depth at which it is determined that a vehicle is wading (sometimes referred to as a threshold wading depth) may be determined by the vehicle design and it is therefore not possible to define a threshold wading depth that is appropriate for all vehicles. Similarly, the permissible maximum wading depth of a vehicle is determined by the vehicle design.

As used herein, the term "HMI-apparatus" refers to all manner of suitable devices that facilitate communication between the vehicle systems and a driver of the vehicle. HMI apparatus may be a single device or more than one device. HMI-apparatus may communicate visually, audibly, or produce a haptic warning or any combination thereof. Visual communications optionally may include: illuminating one or more warning lights, providing symbols, pictures, graphics and text which may be presented on any one or more or a combination of: a dash-board control panel, display screen and heads-up display. Audible communications optionally may include: warning beeps and alarms, voice-over information and may be output through any one or more or a combination of: any in-cabin speaker (including a driver-side ear-level speaker for communications directed at the driver only); head phones (optionally wireless) or ear-piece (optionally wireless). It will be recognised that with advances in technology, various communication devices may become available that are suitable as an HMI-apparatus.

The HMI-apparatus may have an activated status or a not activated status. As used herein, activated status is also referred to as the HMI-apparatus providing wading information to a driver or occupant of the vehicle, and not activated status is also referred to as the HMI-apparatus not providing wading information to the driver occupant of the vehicle. It should be understood that some HMI-apparatus, such as visual displays, may be capable of providing other information to the driver of the vehicle, for example a vehicle location or a vehicle speed. For such HMI-apparatus, the activated status may provide the switching of the display to provide wading information. A not activated status would then switch the display to provide other information. The HMI-apparatus may have current display mode within the activated status. As used herein, the current display mode refers to the information provided by the HMI apparatus. In some aspects of the invention, the display mode may be controlled to determine what information should be provided to the driver or occupant of the vehicle.

Throughout the specification reference is made to the term water. It will be understood that in the context of a land-based vehicle driving through water, the term "water" is intended to encompass all liquid media that a land-based vehicle may drive through and is not limited in its interpretation to pure $H_2O$. For example, as used herein water may mean, but not limited to: a muddy river bed; sea-water; a ford; and dirty water in off-road terrain.

The methods, algorithms and control processes described herein can be machine-implemented. The methods, algorithms and control processes described herein can be implemented on one or more computational device(s) comprising one or more processors, for example, an electronic microprocessor. Such processor(s) may be configured to perform computational instructions stored in memory or in a storage device accessible by the processor(s).

Within the scope of this application it is expressly intended that the various aspects, embodiments, examples and alternatives set out in the preceding paragraphs, in the claims and/or in the following description and drawings, and in particular the features thereof, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which:

FIG. 3D is a further schematic front view of the vehicle of FIG. 1, wherein a bush is disposed in the ford to the left-hand-side (relative to the driver's frame of reference) of the vehicle and the vehicle is disposed on lateral gradient;

DETAILED DESCRIPTION OF EMBODIMENTS

Figure 1:
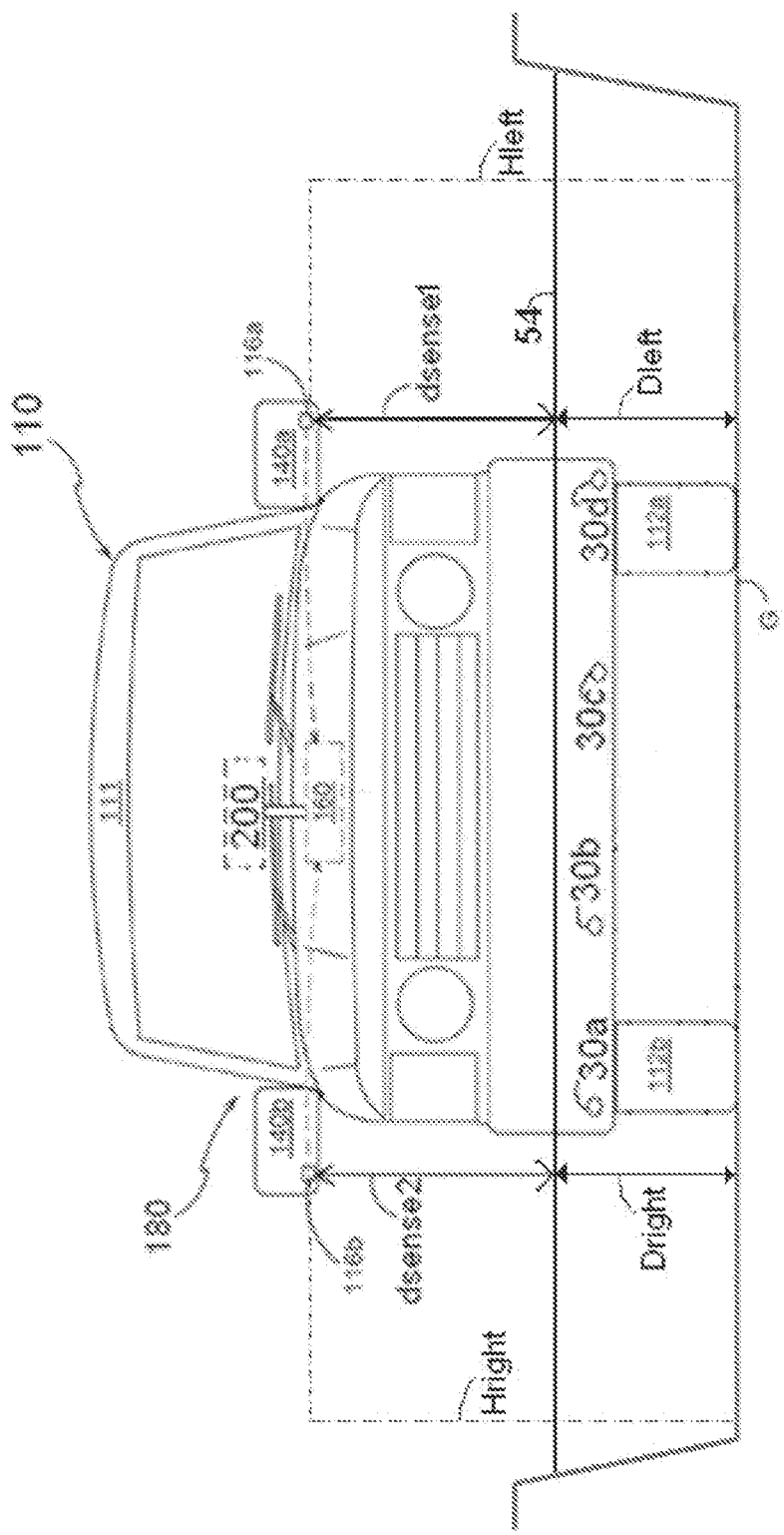
FIG. 1 is a schematic front view of a vehicle having a system for detecting the presence and depth of water about the vehicle using external sensors mounted to the vehicle, the vehicle is shown travelling in a forward direction through a ford.

Detailed descriptions of specific embodiments of the control systems, methods, algorithms, apparatus and vehicles of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the control systems, methods, algorithms, apparatus and vehicles described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Generally, aspects of the present invention relate to a control unit for a system for a vehicle configured to monitor the environment in which the vehicle is being driven by collating data from one or more sensors of the system and analysing that data to interpret the data. The analysis and interpretation of the data may be conducted using one or more or a series of algorithims, optionally arranged on one or more programs executable by the control unit. In certain embodiments of the invention, the analysis and interpretation is conducted specifically to determine whether an in-cabin HMI apparatus configured to convey information and optionally advice to a driver of the vehicle should be activated, suspended, terminated, suspended and if activated what if any information should be communicated. In other embodiments of the invention, the system may be configured to permit manual activation of the in-cabin HMI by a driver, this in itself is data provided to the control system that may be used by the control unit in determining what if any information should be communicated via the manually activated HMI. Additionally or alternatively, the system may be configured to permit manual de-activation of the in-cabin HMI by a driver, however, such a system may be configured to override manual de-activation in certain circumstances as determined by the analysis and interpretation conducted by the control system.

As such, aspects of the present invention relate to a system for a vehicle that uses remote ranging and/or contact sensors to track the rise (and/or optionally fall) of a water surface level as a vehicle approaches, enters and progresses through the water and/or optionally departs from the water. The system is configured to determine when it may be appropriate to automatically activate, terminate or suspend operation of an HMI-apparatus and/or what information the HMI-apparatus should transmit to the driver through a display mode of the HMI-apparatus. Where the HMI-apparatus is a display screen, in determining what information the HMI-apparatus should transmit, the system may be configured to determine what information the display screen should be populated with (i.e. what display mode the HMI-apparatus should be in). References to the HMI-apparatus being populated with information or transmitting information may be used interchangeably in the foregoing description.

Said remote sensors may, for example include, but not are limited to, one or more or a combination of: acoustic, electromagnetic and optical type sensors to measure reflections from the surface of the water. Said contact sensors may optionally include liquid level measurement sensors, for example including but not limited to sensors measuring a change, due to the presence of water, in: pressure, electrical characteristic (for example capacitance, resistance, dielectric constant), electromagnetic (for example optical, including optic fibres) and radio frequency time-of-flight).

Said contact sensors may optionally include liquid level measurement sensors, for example including but not limited to sensors measuring a change, due to the presence of water, in: pressure, electrical characteristic (for example capacitance, resistance), electromagnetic (for example optical) and radio frequency time-of-flight).

Additional data optionally obtained from other vehicle control systems of the vehicle for example, but not limited to: the selected terrain mode (OFF-ROAD, ON-ROAD); the transmission mode (2WD, 4WD, high or low range); the vehicle driving speed; the vehicle driving direction (forwards, reverse), rain sensor data; external camera imagery; GPS and other satellite or other navigation system data; the attitude of the vehicle (roll, yaw and pitch); driveline torque; and ride-height, may be used by the system of the present invention. Information from other vehicle systems may be transmitted directly to the system of the present invention from the vehicle control system having that data (for example, the suspensions system) or may be transmitted via an associated controller via a vehicle CAN-bus or similar vehicle-based data network. Other data may be obtainable via a radio-telecommunications link, for example a wireless internet connection and such information may be transmitted directly to the system of the present invention or may be transmitted via an associated controller via a vehicle CAN-bus or similar vehicle-based data network. Such data may include navigation, mapping, and terrain and traffic news data.

It will be recognised that, to some extent at least, the more data that is provided to the control system, the more confident may be the control system's determinations regarding the environment in which the vehicle is travelling, specifically the determinations relating to the estimated depth of a body of water in which the vehicle may be travelling. As such a system comprising a greater: number, spread and/or variety of type of sensor may obtain a greater quantity and quality of data which taken in combination may enable more confident determinations regarding the vehicle's environment to be made. However, having a greater number, spread and/or variety of type of sensor can increase manufacturing cost, maintenance time and maintenance cost. Additionally, certain physical mounting configurations or use of sensors that may be advantageous for water sensing purposes may be restricted from being vehicle mounted due to: safety requirements and considerations; stylistic preferences; and/or suitability of the sensor placement given that the vehicle may be used off-road an on terrain that may, for example, be bumpy, dirty, wet and rocky. As such the present invention provides a control system with advantageous application in a vehicle having a practical and/or cost-effective arrangement, number and type of sensors.

Additionally, the present invention has advantageous application in vehicles having a more "ideal" (but likely more costly) arrangement, number and variety of type of sensor.

An embodiment of the invention is illustrated schematically in FIG. 1. FIG. 1 illustrates a vehicle 110 having a body 111 and a system 180 comprising one or more or a combination of sensors 116a, 116b, 30a, 30b, 30c, 30d for remote or in-contact detection of the presence of water. The one or more sensors 116a, 116b, 30a, 30b, 30c, 30d are coupled to a control unit 160 and are configured to issue data to the control unit 160 of the system 180. In FIG. 1 only a front aspect of the vehicle 110 is illustrated with sensors 116a, 116b, 30a, 30b, 30c, 30d shown mounted to the left and right side-mirrors 140a, 140b and the front of the front bumper respectively. The vehicle 110 also comprises a similar array of sensors mounted to the rear-bumper, but these are not illustrated. The control unit 160 is coupled to those rear-bumper non-illustrated sensors as well. The water-contact sensors 30a, 30b, 30c, 30d (and/or the rear-bumper sensors) may be distributed at different heights on the front/rear of the vehicle 110 to provide a graduated indication of wading.

Figure 2:
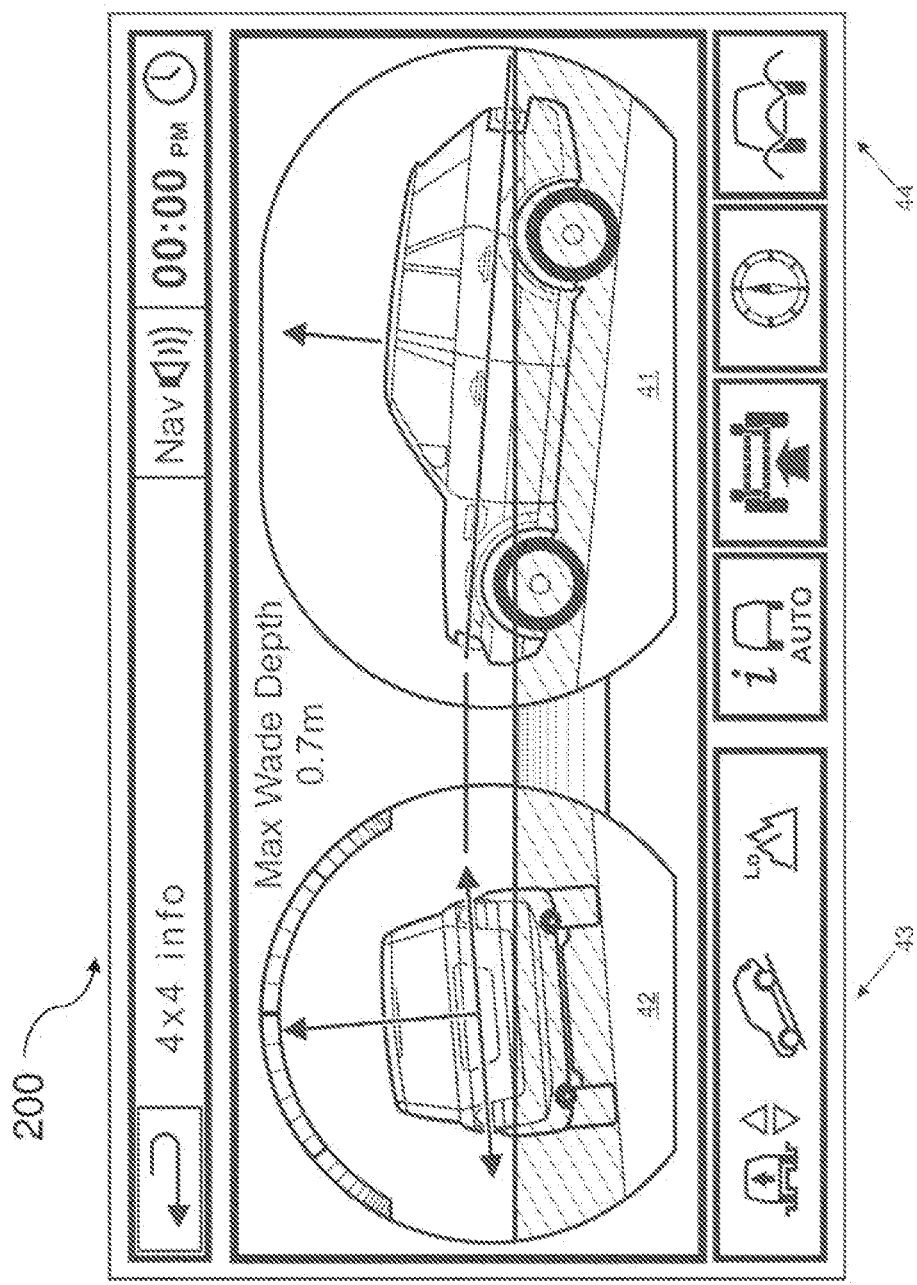
FIG. 2 is an example of a display screen of an HMI according to an optional embodiment of the invention showing information relating to the vehicle and its environment.

Additionally, the system 180 comprises an HMI-apparatus 200, preferably disposed inside the vehicle 110 cabin. Optionally, the HMI-apparatus 200 comprises an LCD or OLED touch-screen display screen, optionally powered by a vehicle battery and optionally wirelessly coupled to the control unit 160 and capable of representing colour graphic signals received from the control unit 160 and capable of reproducing audio signals. In other envisaged embodiments, the HMI-apparatus is not necessarily capable of reproducing audio signals and the control unit may be coupled to an audio system and/or speakers within the cabin for representing information audibly to the driver of the vehicle. An optional iilustration of an HMI-apparatus 200 in the form of a display screen is shown in FIG. 2. The HMI-apparatus has been automatically activated by a control unit 160 of the system 180 and has been populated with data and graphics as instructed by the control unit 160. The HMI-apparatus has been populated to convey at least the following information:

the vehicle 110 is on a lateral gradient (42);
the vehicle 110 is on a longitudinal gradient (41);
the vehicle 110 is in a "nose-up" attitude; and a maximum wading depth for that vehicle 110, shown in the example as 0.7 m, may be reached within a specified distance ahead of the vehicle 110 in current vehicle 110 direction of travel.

Returning to FIG. 1, sensors 116a, 116b are water surface ranging remote sensors and sensors 30a, 30b, 30c, 30d are contact-water detection sensors, optionally each of the sensors 116a, 116b, 30a, 30b, 30c, 30d is an ultrasonic transducer.

The ranging sensors 116a, 116b, are arranged to face substantially downwardly or at a declined angle as desired in order to measure as distance dsense1; dsense2; to a surface 54 beneath the sensor 116a, 116b. In the presently illustrated embodiment, each sensor 116a, 116b, is an ultrasound transducer 116a, 116b, and is capable of emitting an ultrasound pulse and receiving a reflection of that pulse. The speed of an ultrasound pulse in air is known; the mounting height (Hleft, Hright) of each ultrasound transducer 116a, 116b, is also known (giving due regard to vehicle ride height and attitude (angles of roll, yaw and pitch), in order to estimate the depth of the water more accurately). Therefore, from the time of flight (TOF) measured by the sensors 116a, 116b the distance dsense1; dsense2; can be determined and from that target distance dsense1, dsense2, the depth of that surface 54 above the ground level G upon which the vehicle 110 is disposed can be estimated. (As described in: GB1204594.4 (filed 15 Mar. 2012), GB1202617.5 (filed 15 Feb. 2012), GB1104367.6 (filed 15 Mar. 2011), GB1204593.6 (filed 15 Mar. 2012), PCT/EP2011/072998, PCT/EP2011/072999, and PCT/EP2011/072997, all and any of which are hereby incorporated herein by reference). Information from each sensor 116a, 116b may be used by the control unit 160 to estimate the depth of the water 54 as follows:

Depth (Dleft): of water 54 estimated from data obtained by left sensor 116b $Dleft \approx Hleft - dsense1;$ Depth (Dright) of water 54 estimated from data obtained by right sensor 116a:

$Dright \approx Hright - dsense2;$

In the illustrated embodiment of FIG. 1, the vehicle air-suspension is set to standard and Hleft and Hright are equal to one another and are about 1.20 m (about 1200 mm). In other embodiments Hleft and Hright may not be equal to one another, but for a given vehicle suspension mode, both parameters Hleft and Hright will be known. The vehicle air-suspension may also be set to a non-standard height and Hleft and Hright adjusted accordingly.

The contact-sensors 30a, 30b, 30c, 30d illustrated in FIG. 1 optionally are ultrasound emitters/receivers (transducers). Such sensors 30a, 30b, 30c, 30d may include a diaphragm which is energized momentarily to transmit an ultrasound pulse. Such a diaphragm has a substantially different settling time in water, as compared with the settling time in air, and data related to the settling time issued to the control unit can be used to determine that the sensor is in contact with water (as is described in PCT/EP2011/072998 and PCT/EP2011/072999). The sensors 30a, 30b, 30c, 30d are optionally mounted at about 450 mm above ground level in normal ride-height conditions and on level ground. Optionally, the four contact sensors are arranged to be at about the same height, however, in other envisaged embodiments, one or more of the sensors 30a, 30b, 30c, 30d may be at an elevated or lower height relative to one or more of the other sensors 30a, 30b, 30c, 30d In FIG. 1, the vehicle 110 is shown driving through a ford in which a water level 54 is depicted relative to the vehicle 110. The vehicle 110, at the snap-shot illustrated in FIG. 1 is disposed on a flat surface, in level-conditions and at normal ride height.

When a contact-water sensor (also referred to as a submersion sensor) 30a, 30b, 30c, 30d is submerged in water, its physical behavioural characteristics change in a measurable manner that can be used to determine with 100% confidence that the water submersion sensor is submerged in water. The data received by the control unit 160 from the remote (optionally downward facing) sensors 116a, 116b can be used to deduce the depth of the water. The system for aiding wading also comprises one or more vehicle attitude sensors (such as accelerometers and gyroscopes) that can determine the pitch and roll angles of the vehicle. Therefore, in the present configuration the data that may be provided to the control unit 160 of the system 180 is summarised below:

a) The status: "in-water" or "not in-water" from the right-side-front sensor 30a;
b) The status: "in-water" or "not in-water" from the right-side-front sensor 30b;
c) The status: "in-water" or "not in-water" from the left-side-front sensor 30d;
d) The status: "in-water" or "not in-water" from the left-side-front sensor 30c;
e) The depth (Dleft) of a surface 54 estimated or derived from data obtained by a Left-Mirror sensor 116a;
f) The depth (Dright) of a surface 54 estimated or derived from data obtained by a Right-Mirror sensor 116b;
g) Pitch Angle of the Vehicle ($\alpha_P$); and
h) Roll Angle of the Vehicle ($\alpha_R$);

The data listed at (a) to (h) can be used in combination to automatically cause an HMI-apparatus 200 (also referred to as a wade-assisting display) to switch on (also referred to as activate) in the vehicle 110 cabin to display information to the driver. Alternatively, the information data listed at a) to h) can be used to automatically cause a wade-assisting display 200 that has already been manually switched on by a driver to be populated with information regarding, but not limited to:

The depth of the water in which the vehicle is currently disposed (which may change in real-time or change in a time averaged manner);
The relative attitude of the vehicle to the water level;
The maximum depth of water the vehicle can wade in; and
The estimated distance (or time given maintenance of current vehicle speed) until maximum wading depth may be reached.

This information, and optionally other information (optionally as described in PCT/EP2011/072992, PCT/EP2011/072994 and PCT/EP2011/072996) may be displayed to the driver on the wade-assisting display 200. For example, as illustrated in FIG. 2, the HMI-apparatus 200 may pictorially represent the attitude of the vehicle and optionally, to-scale, graphically depict an average position of the water level relative to the vehicle 110; and an estimation until maximum wading depth may be reached.

However, it has been identified that there are circumstances where a basic assessment of the data, such as data (a) to (h) listed above could lead to the HMI-apparatus 200 being activated inappropriately or being populated with information that may not entirely accurately reflect the situation the vehicle 110 is in. It would not be desirable for a system to initiate a display of information that indicates a wading event if in fact the vehicle 110 is not wading. Additionally or alternatively, it is not desirable for the HMI-apparatus 200 to rapidly alternate between activating and de-activating the HMI-apparatus or rapidly alternating between initiating display of the wade-assisting information on the HMI-apparatus and terminating the display of the wade-assisting information.

Furthermore it is disadvantageous if the system displays information that changes very rapidly. For example, in FIG. 3A a scenario is illustrated wherein the depth of water 56 relative to the vehicle 110 is on the cusp of a wading event. Water is lapping about (above and below) the water submersion sensors 30a, 30b, 30c, 30d (which are optionally mounted at a height (in normal ride-height conditions) of about 450 mm above ground level G which may correspond to an optional wading depth threshold). Fast flickering on and off of the HMI-apparatus 200 could be irritating or distracting to a driver and additionally, could make a display difficult to read. Similarly an audible beep to warn of a wading event that rapidly sounds on and off or the illumination of a warning light that rapidly flickers on and off could be irritating or distracting.

Similarly it may be disadvantageous if the wade aid display (HMI) is automatically terminated when a driver might still expect it to be displayed. An abrupt termination of the HMI-apparatus 200 may mislead the driver into considering that the HMI-apparatus has failed rather than automatically deactivated. Therefore, a further aspect of the invention aims to provide a control unit 160 for a wade-assisting system 180 that is configured to carefully manage the automatic termination of the wade-assisting HMI-apparatus 200.

Furthermore, a fast changing population or activation/deactivation of an HMI-apparatus 200 due to the presence of, for example: bushes, long grass, reeds, boulders, and/or uneven land (which may be often present in an off-road situation), could also be irritating. See for example, in FIG. 3B, the vehicle 110 is disposed in a deep rut (which may be encountered in an off-road situation) with an upper ground surface 58, 60 being disposed between the sensor 116b and the sensor 116a and the ground G upon which the vehicle 110 is travelling. It would be desirable for a wade-assisting display to be manually operable by a user of the vehicle who may know that the vehicle 110 is going to be taken off-road and driven in an environment where the occurrence of a wading event is likely. In FIG. 3B the estimated depth Dright from the right sensor 116b is about 750 mm, whereas the estimated depth Dleft from the left sensor 116a is about 800 mm. In such a situation, consideration needs to be given to what information the manually-activated HMI-apparatus should be populated with.

Figure 3A:
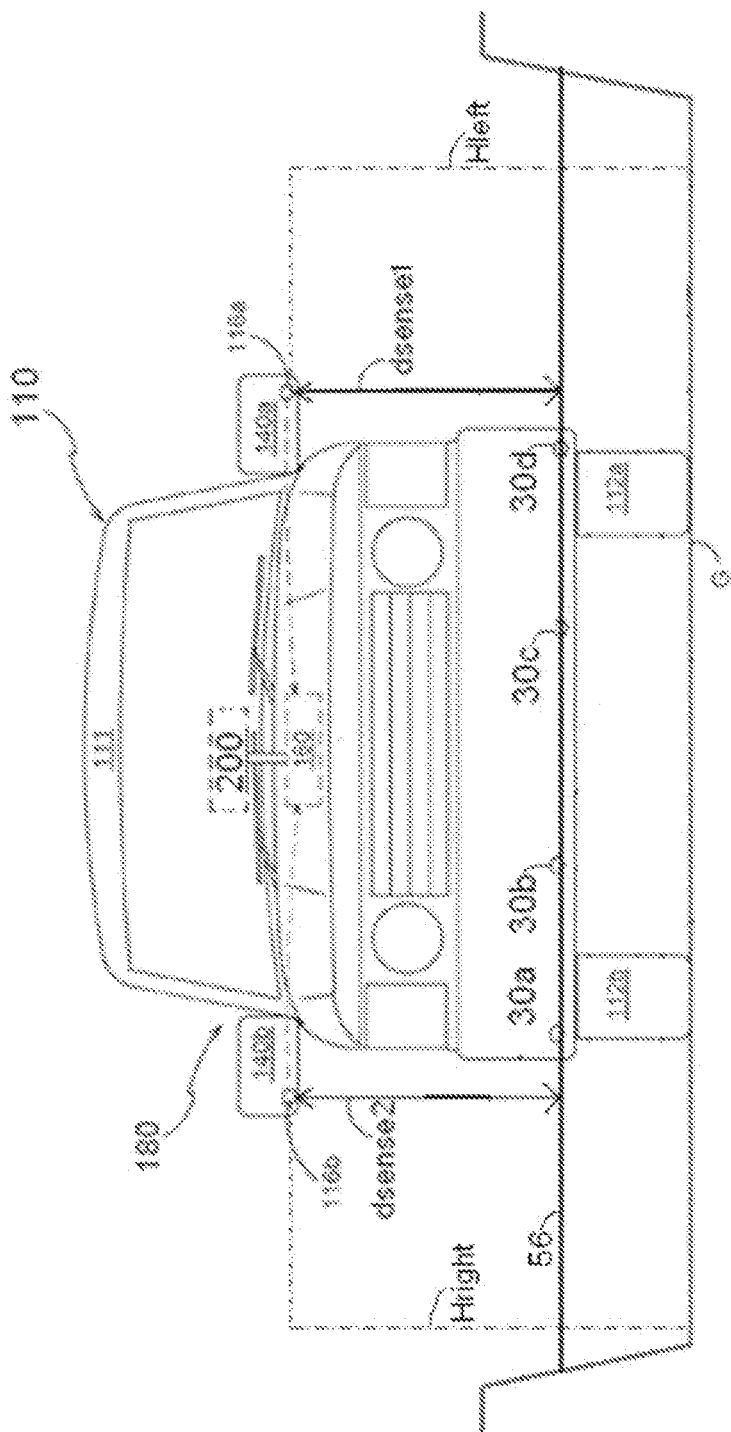
FIG. 3A is a further schematic front view of the vehicle of FIG. 1, wherein a water level within the ford, is similar to the height of water-contact sensors mounted to the front bumper of the vehicle.
Figure 3B:
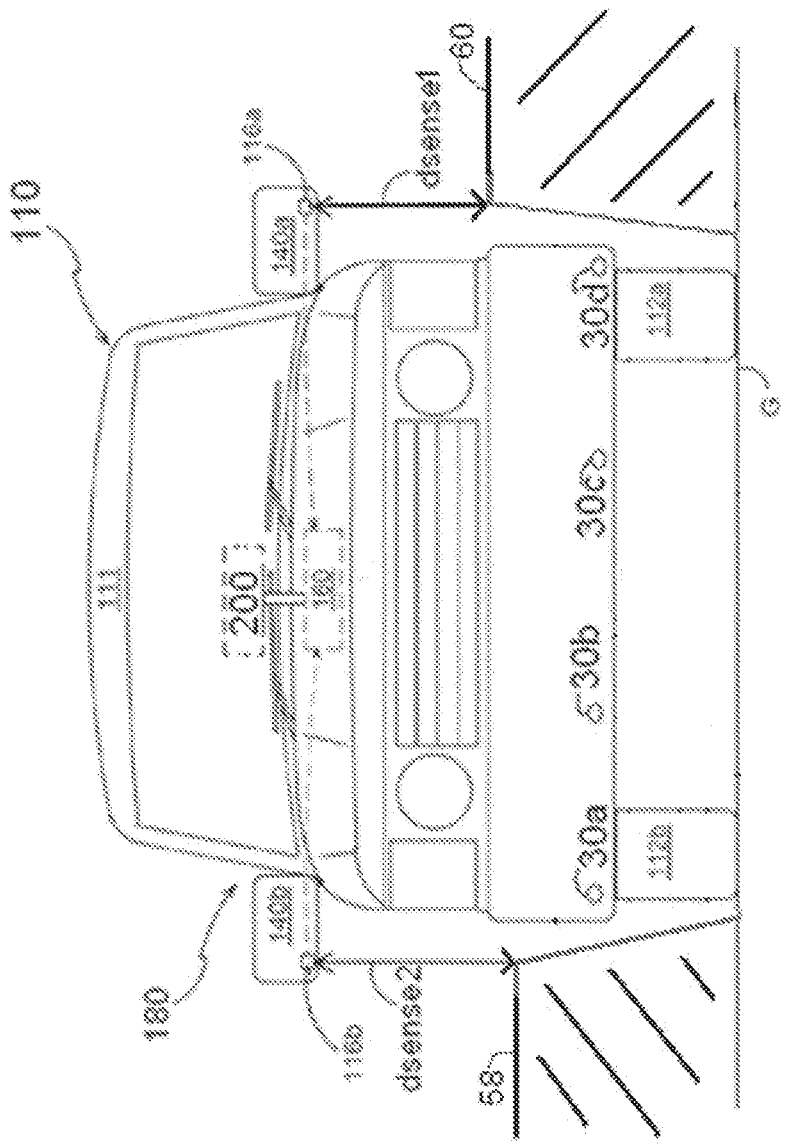
FIG. 3B is a further schematic front view of the vehicle of FIG. 1, disposed in a rut or ford, wherein edges of an upper ground surface are disposed on either side of the vehicle.
Figure 3C:
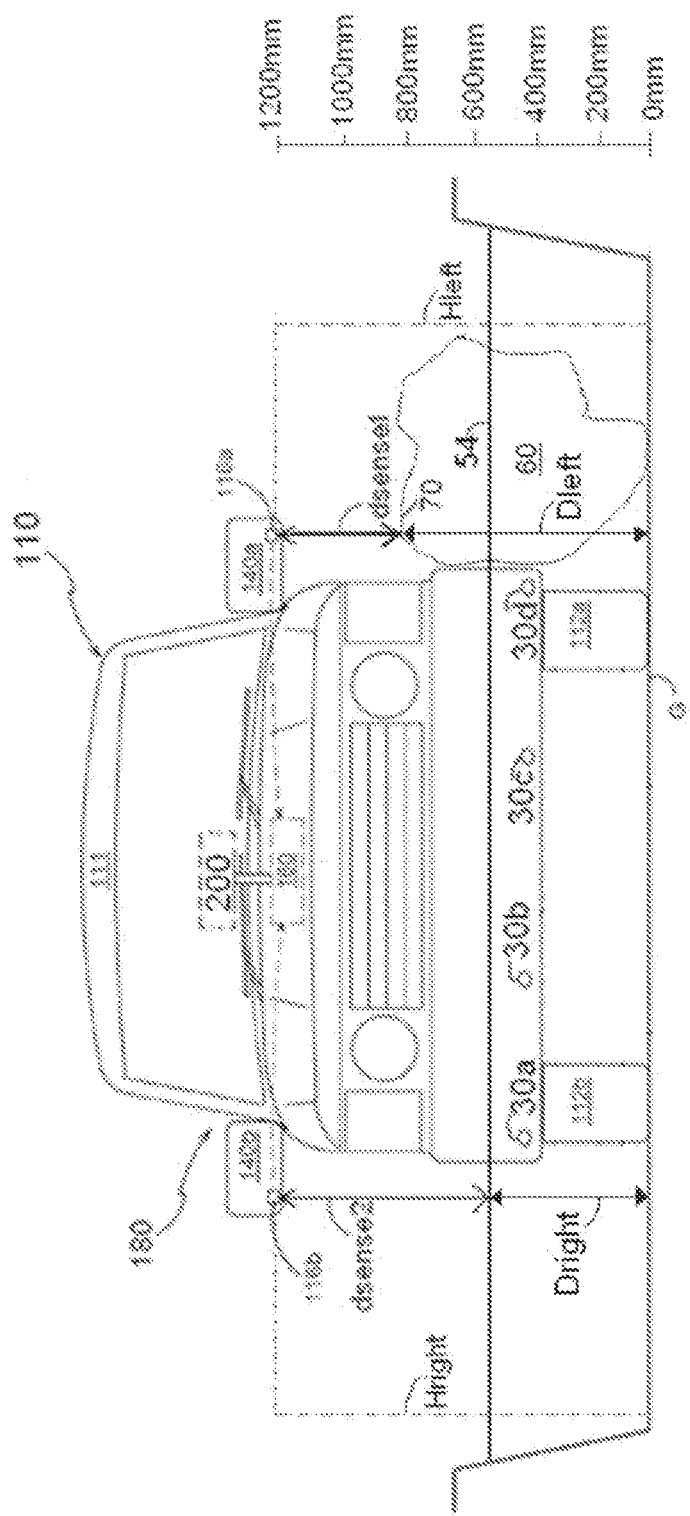
FIG. 3C is a further schematic front view of the vehicle of FIG. 1, wherein a bush is disposed in the ford to the left-hand-side (relative to the driver's frame of reference) of the vehicle.

A further example, where a basic analysis of data (a) to (h) could give rise to a false indication that the HMI-apparatus 200 should be activated or populated is illustrated in FIG. 3C. The measurement marker illustrated in FIG. 3C is not necessarily to scale and the measurements suggested herein are by way of example and for explanation purposes only and in no way serve to limit the invention to application within certain measurement limits, it being understood that vehicle 110 dimensions vary; sensor 116a, 116b mounting heights are not restricted: ride height may be adjusted, wading threshold depth may defined differently for different vehicles and/or scenarios; maximum wading depth is particular to vehicle design and sensor mounting heights 30a, 30b, 30c, 30d may also vary in different envisaged embodiments.

In the illustrated example of FIG. 3C, the sensor 116a on the left-side mirror 140a has detected a surface at depth 70 at a short range of approximately 400 mm (±tolerance Δt). Whereas, the sensor 116b on the right-side mirror 140b has detected a much longer range of say 700 mm (±tolerance Δt) to a nearest surface 54. From the target range data obtained, the depth (Dleft) of a surface 70 estimated by the Left-Mirror sensor 116a is determined to be about 800 mm, whereas the depth of a surface 54 measured by the Right-Mirror 140b sensor 116b (Dright) is only 500 mm. This may be referred to as an asymmetric water depth measurement. In this scenario, the wading detection water contact-sensors 30a, 30b, 30c, 30d are each submerged and therefore it is known by the control unit 160 with a high-confidence level, that water is present about the vehicle 110 at least at a wading height threshold. The nearest surface detected by the Left-mirror is actually a bush 60, which may be more generically referred to as an interference object 60.

The potential effects of the presence of an interference object on the mirror 140a, 140b sensor 116a, 116b measurements is considered and accounted for by the present invention in order to avoid falsely alerting the driver to every high water level about the vehicle 110.

Yet a further example of a potential discrepancy that could lead to an inappropriate decision to startup and/or populate data onto the in-car wade aid screen (HMI) and/or lead to an inaccurate assessment of water depth (WD) being displayed on the wade-assisting in car information screen (HMI) is illustrated in FIG. 3D. In FIG. 3D, the vehicle 110 is on a surface having lateral non-zero gradient (as is common in an off-road situation) of roll angle $\alpha_R$. However, based upon the remote ranging sensor 116a, 116b data, asymmetric depths Dleft, Dright are estimated. The asymmetric measurement however, does not correspond to the roll angle αR of the vehicle lateral gradient.

The right-side and left-side depth estimations Dright, Dleft (preferably calculated based upon the following equation and therefore considering the lateral gradient αR of the vehicle 110:

$$Dleft = \frac{(Hleft - desense1)}{\sin(\alpha_R)}$$

are not equal and a control unit 160 needs to be configured to decide what to do in such a scenario. Should the wade-assisting display 200 be activated? If already activated, should it be maintained activated and if maintained in an activated state, what information should be displayed? A control unit configured to carry out a simple algorithm could decide to display an average of the two depths Dleft and Dright. In the illustrated arrangement of FIG. 3D, the Dright is about 500 mm, whereas Dleft is about 700 mm. In this scenario, an average depth of 600 mm though, misleading, may not be too consequential; however, in other scenarios (greater depth and/or greater roll angle αR), such information may be very misleading.

Water (in the absence of a drain or tap or significant current), tends to adopt a substantially level surface. The side mirrors 140a, 140b are spaced apart, preferably on the same lateral axis of the vehicle 110 (side-to-side axis of the vehicle 110, for example between the left and right side mirrors 140a, 140b). Therefore the detection of a surface of equal or substantially equal depth by each side-mirror 140a, 140b mounted sensor 116a, 116b can be used to determine with reasonable confidence that a level but non-ground surface exists between the mirrors 140a, 140b and therefore that at least part of the vehicle 110 is disposed in water. Range data dsense1, dsense2 from the sensors 116a, 116b can be used to derive or estimate with a reasonable degree of accuracy the depth (Dright, Dleft) of the water along that lateral axis (giving due regard to and compensating for the attitude of the vehicle 110), (as is described in GB1202617.5 and GB1204594.4). Therefore, with reference to FIG. 3D, it would be expected that Dright>Dleft. In the absence of such a finding (and bearing in mind a tolerance on the estimations themselves), the detected surfaces or data obtained needs to be carefully considered. It should be noted that where the sensors are not positioned on the mirrors 140a, 140b, the sensors may be positioned on different lateral axes and indeed at different heights on the vehicle. In such embodiments, appropriate adjustment of the detected range is made according to Hright and Hleft as previously discussed.

Figure 4:
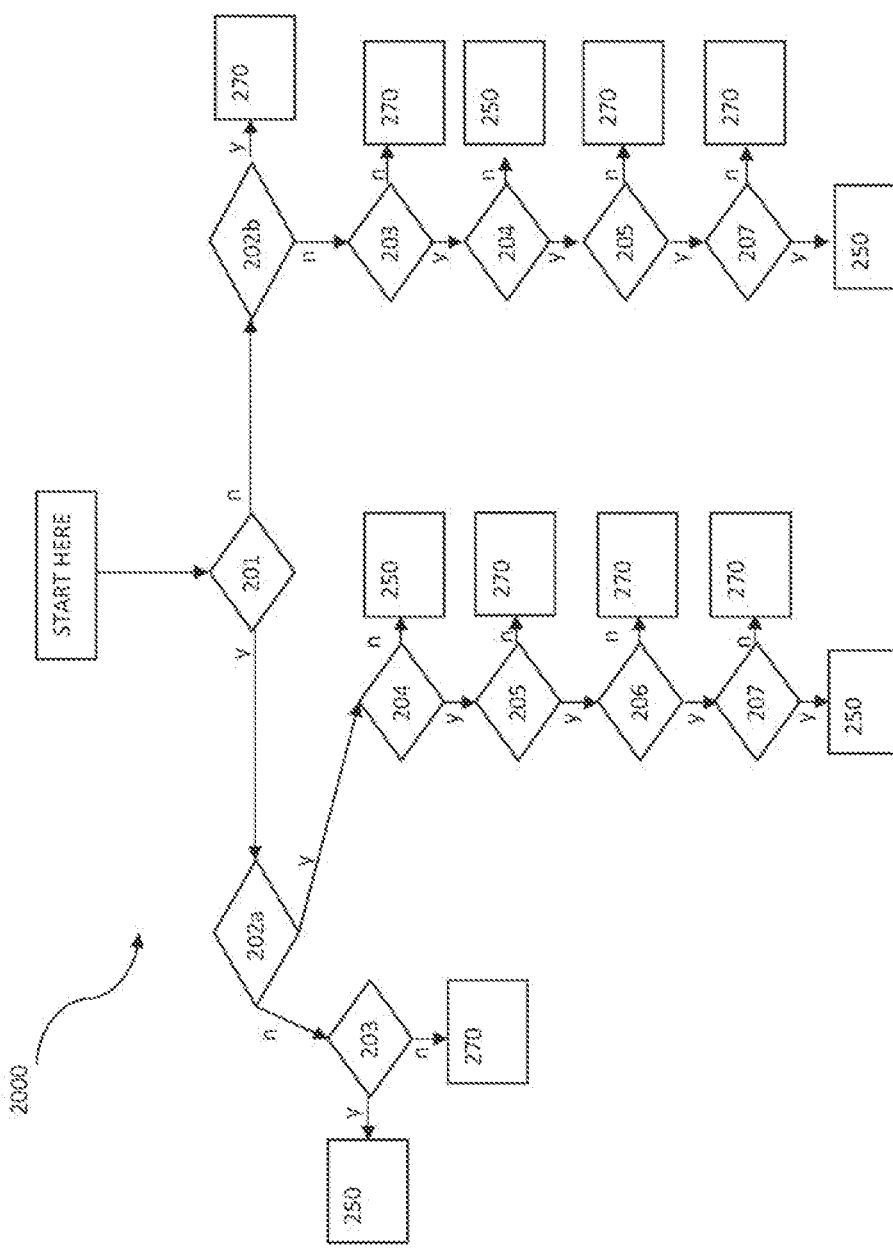
FIG. 4 is a decision tree illustrating schematically an algorithm or part of an algorithm carried out by the control unit of the system of FIG. 1 according to an optional configuration of the control unit of the system.
Figure 5:
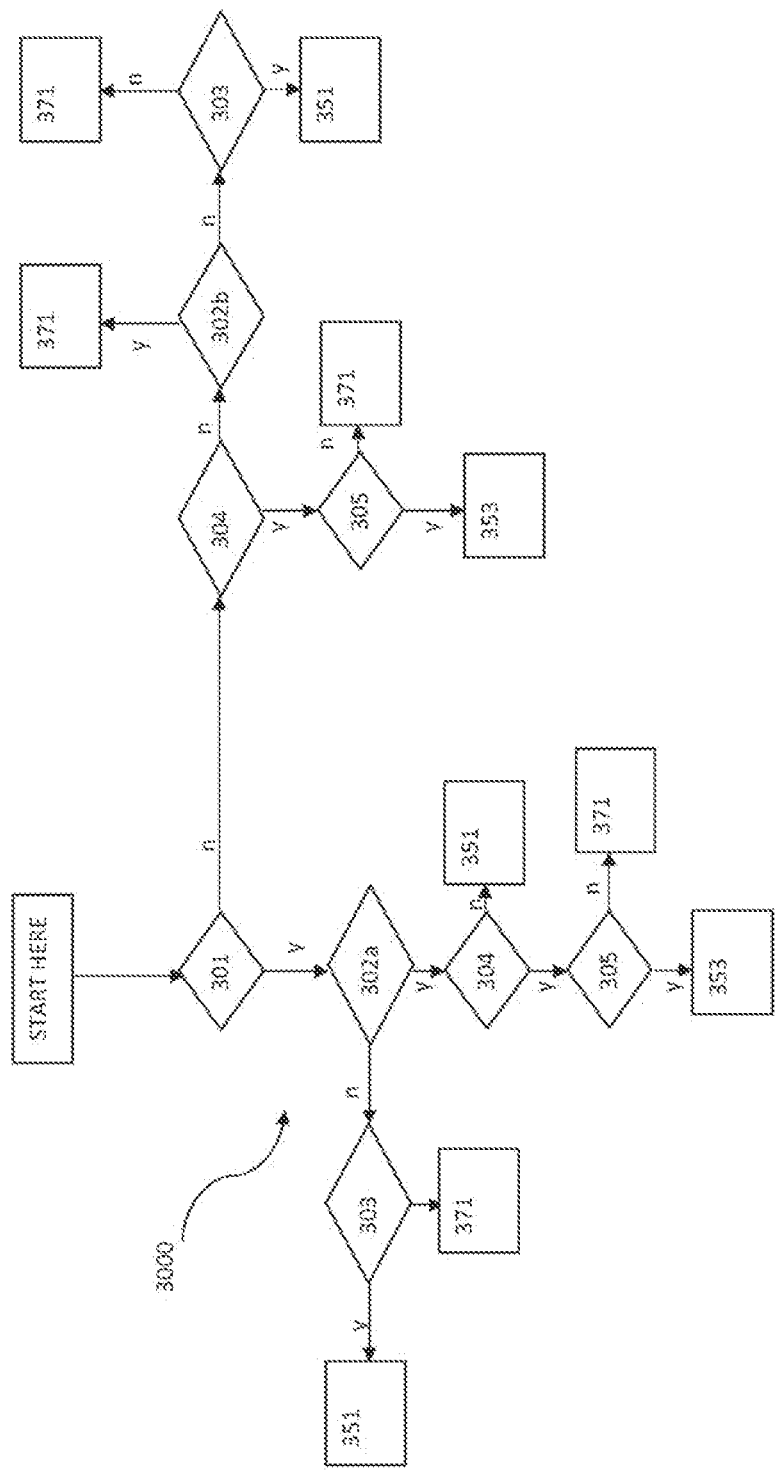
FIG. 5 is a decision tree illustrating schematically an algorithm or part of an algorithm to carried out by the control unit of the system of FIG. 1 according to another optional configuration of the control unit of the system.
Figure 6:
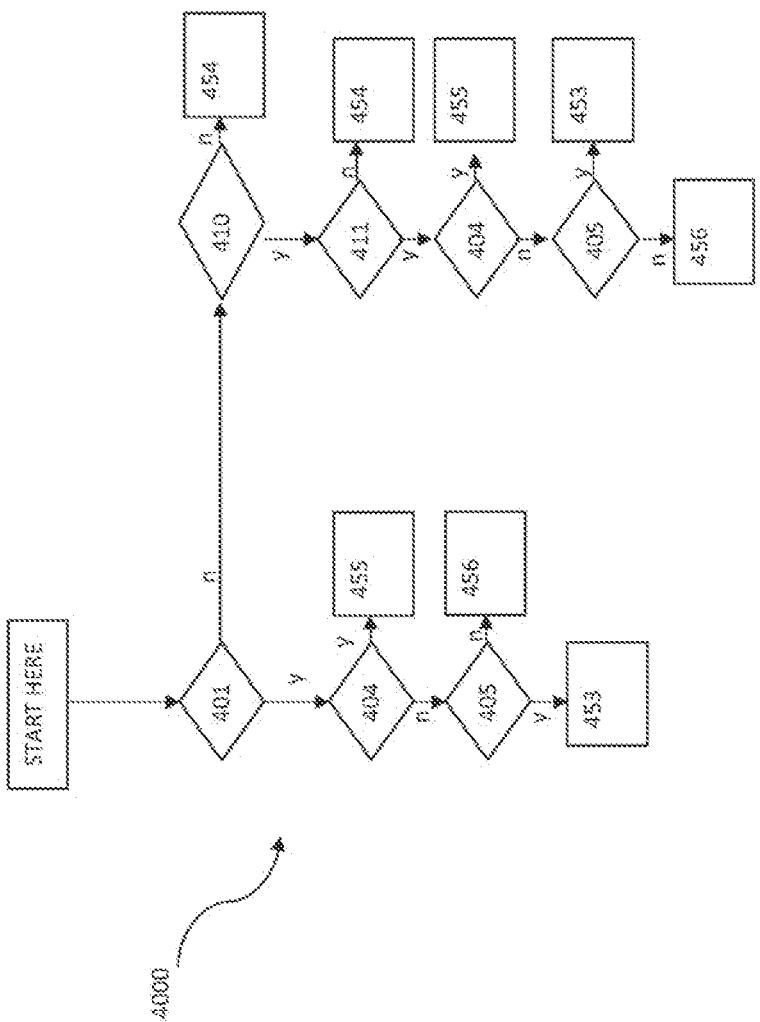
FIG. 6 is a decision tree illustrating schematically an algorithm or part of an algorithm carried out by the control unit of the system of FIG. 1 according to an yet another optional configuration of the control unit of the system.

Turning now to FIGS. 4-6, the system 180 has beneficially been configured to look for discrepancies such as a significant difference between the left mirror range and the right mirror range; consider the possible implications of that difference; give consideration to the fact that laying or flowing water typically will adopt a level surface and then make a decision or take action. For example, depending upon the data received and the decisions taken, the action adopted may be any one of the following:

- Activate the wade-assisting display (HMI) automatically (250, 350, 450);
- Populate an activated wade-assisting display (HMI) with information (for example as shown above using a blue highlighted area to illustrate the water position relative to the vehicle);
- Do not activate wade-assisting display (HMI) automatically (270, 370, 470);
- Do not populate an activated wade-assisting display with any information;
- Populate an activated wade-assisting display with information that an object is detected which may not be water (optionally such an indication could be made using a colour coding that is contrasting or different to a colour used to illustrate a water level);
- Deactivate an activated HMI-apparatus; and
- Override a user-selection for manual operation only in certain circumstances, for example, water depth estimated close to the maximum wading depth and activate automatically an HMI-apparatus or other warning device.

The present invention provides a careful interrogation of the data a) to h) supplied by the vehicle 110 sensors 116a, 166b, 30a, 30b, 30c, 30d to enable the control unit 160 of the system 180 for aiding wading to eliminate or at least mitigate against the occurrence of:

- "false-positive" interpretations of the data a) to h); and/or
- falsely displaying information to a driver indicative of a vehicle wading through water at a certain level, when in fact the vehicle is wading through water at a different level (much shallower or much deeper water); and/or
- switching between displaying and not displaying the in-car wade-assisting information screen too rapidly; and/or
- showing very fast moving information that may be hard for a driver to monitor and assimilate.

Along with the provision of a careful interrogation of the available data a) to h), in envisaged embodiments of a wade-assisting system 180, the available data is interrogated over a period of time before a decision or action is taken and/or the available data is averaged over time and then a decision taken based upon that averaged data.

The control unit 160 is configured to conduct an assessment of the environment the vehicle 110 is in by analysing and interpreting the data issued to it by the sensors 116a, 116b, 30a, 30b, 30c, 30d and optionally other vehicle sensors and other vehicle parameters issued to it over time (such as vehicle attitude, direction of vehicle travel (FORWARD, REVERSE), vehicle speed, ride height and relative mounting height of sensors 116a, 116b, 30a, 30b, 30c, 30d). This is optionally achieved by the control unit 160 executing a program comprising an algorithm. An optional algorithm 2000 is illustrated schematically in FIG. 4 and described further below.

In a first optional configuration of the system 180, the control unit 160 may be configured to carry out an analysis of the data received from sensors 116a, 116b, 30a, 30b, 30c, 30d based upon the decision tree or algorithm 2000 illustrated in FIG. 4. In the first embodiment of the system 180, the in-car HMI-apparatus 200 is activated and deactivated either automatically by the control unit 160 of the system 180 or manually by a user. (In a system 180 where manual activation/deactivation of the HMI-apparatus 200 is permitted special consideration needs to be given to the information that the HMI-apparatus 200 is populated with. This is because the HMI-apparatus 200 may be activated manually before any water-contact sensor 30a, 30b, 30c, 30d detects the presence of water.) The following decisions are taken in each numbered box in the flowchart of FIG. 4:

250: Activate the HMI-apparatus 200 automatically;
270: Do not activate the HMI-apparatus 200 automatically;
201: Is water presence detected (optionally at threshold wading depth)?
Is one or more of the front or rear contact sensors (30a, 30b, 30c, 30d; rear contact sensors not illustrated) indicating submersion in water?
202a: Is a surface detected above a contact sensor when water is detected?
Is Left-side estimated depth (Dleft) and/or the Right-side estimated depth (Dright) greater than the height of any contact sensor issuing a positive in-water signal, giving consideration to the ride height/suspension setting of the vehicle, (for the vehicle 110 illustrated the mounting height of the sensors 30a, 30b, 30c, 30d in normal ride-height is 450 mm)?
202b: Is a surface detected above threshold wading depth when water is not detected?
Is Left-side estimated depth (Dleft) and/or the Right-side estimated depth (Dright) greater than the height of any contact sensor 30a, 30b, 30c, 30d, giving consideration to the ride height/suspension setting of the vehicle 110, (for the vehicle 110 illustrated the mounting height of the sensors 30a, 30b, 30c, 30d in normal ride-height is 450 mm)?
203: Is a low surface detected?
Is the Left mirror sensor depth (Dleft) and/or the Right mirror sensor depth (Dright) measured within a pre-defined low-calibrateable range? The low-calibrateable range may optionally correspond to a depth range below which, for a given vehicle, it has been determined that any water/surface is too low in depth to need to alert and/or caution the driver by automatically activating the HMI, and/or is likely to correspond to an interference object at this height, for example grass, rut in off-road terrain and therefore according to an optional aspect of the invention any water detected below a lower limit of this low-calibrateable range will not give rise to activation of the HMI-apparatus 200. The low-calibrateable range may therefore be, for example between about 125 mm to 450 mm or alternatively between about 250 mm to 450 mm. It should be noted that once an HMI-apparatus 200 is already activated, estimated water depths in this low-calibrateable range may be displayed on the HMI-apparatus. The upper limit of the low-calibrateable range may be the wading depth threshold.

204: Are the water depth estimations Dright, Dleft asymmetric?

Is the Left mirror sensor measured depth different to the Right mirror sensor measured depth, optionally giving consideration to a tolerance ΔT in each estimation, further optionally of say ±100 mm? In other words, is the water depth measurement asymmetric, allowing for ΔT? (|Dleft−Dright|>ΔT).

205: Is the vehicle on a lateral gradient ($a_R$)?

206: Is there correspondence between asymmetric Dright and Dleft and lateral gradient αR?

Is the position of the one or more contact sensors 30a, 30b, 30c, 30d issuing an "in-water" status on the same side as the mirror range measurement that indicates greatest water depth?

207: Is the asymmetric depth signal asymmetric to a degree that corresponds to the lateral gradient angle ($α_R$)?

Based upon the data provided to the control unit 160, the control unit 160 is configured to consider the first question in the flow chart and based upon the answer (yes (y) or no (n)), the control unit 160 is configured to consider a subsequent decision/question or to cause an action, as illustrated.

With reference to the scenario illustrated in FIG. 1, the system 180 of the present embodiment, using the algorithm as illustrated in FIG. 4 and described above will make the following determinations:

Question 201: yes→GOTO question 202a;

Question 202a: yes→GOTO question 204;

Question 204: no→Action 250: Activate the HMI-apparatus 200 automatically to indicate to the driver that the vehicle 110 is disposed in a body of water at or above threshold wading depth.

As can be seen from FIG. 1, the control unit 160, upon execution of an algorithm 2000 such as that illustrated in FIG. 4, is configured to determine that the HMI-apparatus 200 automatically should be activated. In envisaged embodiments where the HMI-apparatus 200 is a display screen such as that indicated in FIG. 2, the automatically activated HMI-apparatus 200 graphical display may optionally illustrate the depth of the wading water, which is about 500 mm.

The system 180 may optionally be configured to sample data issued from each of the sensors 116a, 116b, 30a, 30b, 30c, 30d over time using any suitable mathematical technique, for example low-pass filtering, which may optionally include the averaging of intermittently taken data values. Additionally, or alternatively, once a determination has been made that the estimated depths Dleft and Dright are substantially equal (in other words are within a pre-determined tolerance ΔT of one another, wherein ΔT may optionally be about 100 mm and in other embodiments may be about 50 mm to about 150 mm); an average of the two depths $$\left(\frac{(Dleft + Dright)}{2}\right)$$

may be taken to determine a display value depth for the HMI-apparatus 200.

The resolution or degree of accuracy of the display value depth is optionally, albeit preferably lower than the resolution or degree of accuracy of any of: the estimated depth values Dleft, Dright; the averaged estimated depth values $\overline{Dleft}$, $\overline{Dright}$; the average of the estimated depth values $$\frac{(Dleft + Dright)}{2}.$$

With reference to the scenario illustrated in FIG. 3A, the system 180 of the present embodiment, using the algorithm 2000 as illustrated in FIG. 4 and described above, will make the following determinations:

Question 201: yes→GOTO question 202a;

(Whereas, water may be lapping above and below, once a positive detection of water is made by any of the sensors 30a, 30b, 30c, 30d, the control unit 160 will answer question 201 positively; though in a subsequent time frame, the same question would be answered negatively, the control unit 160 may optionally be configured to use an exit algorithm to determine whether the HMI-apparatus 200 should automatically be deactivated. This is described below with reference to FIG. 7. Additionally in an embodiment where averaging of the data signals is conducted, if the lapping water spends a greater amount of time below the sensors 30a, 30b, 30c, 30d than at or above the level of the sensors 30a, 30b, 30c, 30d, then the when the control unit 160 executes the algorithm 2000 depicted schematically in FIG. 3, the averaged data upon which the answers to the questions posed are based may in fact be a "0" indicating that the sensors are not submerged. Similarly, if the lapping water spends a greater amount of time at or above the sensors 30a, 30b, 30c, 30d than below the level of the sensors 30a, 30b, 30c, 30d, then when the control unit 160 executes the algorithm 2000 depicted schematically in FIG. 3, the averaged data upon which the answers to the questions posed are based may be a "1" indicating that the sensors 30a, 30b, 30c, 30d are submerged. In this way, by using time-averaged data sampling, the system 180 is configured to answer question 201 positively only when it is more likely than not that water at wading depth has been detected.)

Question 202a: yes→GOTO question 204;

(Again, whereas, water may be lapping above and below the sensors 30a, 30b, 30c, 30d, the present question 202a requires a detected surface depth (based upon the data from one or both remote sensors 116a, 116b to be greater than the mounting height of any of the sensors 30a, 30b, 30c, 30d. As such, the control unit 160 increases the confidence in its determination that water is present at or above the threshold wading depth (which optionally may be equivalent to the mounting height of the contact sensors 30a, 30b, 30c, 30d). Again, time averaging of the data signals from the remote-sensors 116a, 116b will further increase the accuracy of the deductions made by the control unit 160.)

Question 204: no→Action 250: Activate the HMI-apparatus 200 automatically to indicate to the driver that the vehicle 110 is disposed in a body of water at or above threshold wading depth.

Figure 7:
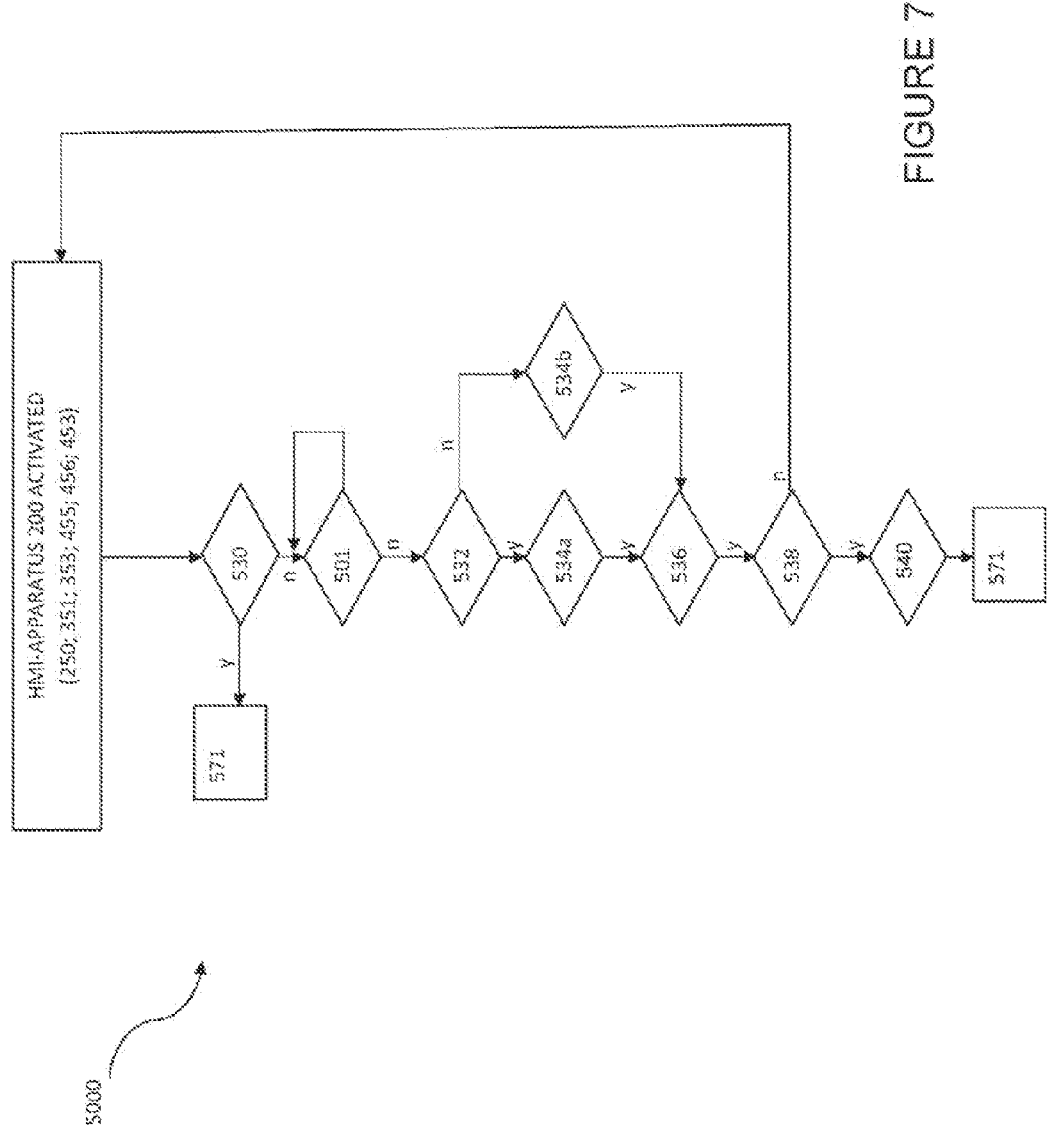
FIG. 7 is a decision tree illustrating schematically an algorithm or part of an algorithm carried out by the control unit of the system of FIG. 1 according to an yet another optional configuration of the control unit of the system.

As discussed above, one activated, the HMI-apparatus is preferably latched on for a pre-determined display time and automatically deactivated in a controlled manner in accordance with a separate decision tree (see FIG. 7). In this way rapid flickering between on and off-states of the HMI-apparatus 200 is avoided.

With reference to the scenario illustrated in FIG. 3B, the system 180 of the present embodiment, using the algorithm 2000 as illustrated in FIG. 4 and described above will make the following determinations:

Question 201: no→GOTO question 202b;

Question 202b: yes→Action 270: False positive detected, do not activate the HMI-apparatus 200 automatically or if HMI-apparatus manually activated, do not show Dleft or Dright depths.

Optionally in manual ON mode, in this situation the control unit 160 may be configured to display a colour coded graphic indicating that a surface was detected but that it is not considered to be water; for example grey may be used for unknown detected objects and blue for water. Further optionally, a written notice may simply state something like: "Wading assistant active—water at wading depth not detected".

With reference to the scenario illustrated in FIG. 3C, the system 180 of the present embodiment, using the algorithm 2000 as illustrated in FIG. 4 and described above will make the following determinations:

Question 201: yes→GOTO question 202a;
Question 202a: yes→GOTO question 204;
Question 204: yes (Dleft 800 mm and Dright 500 mm)→GOTO 205;
Question 205: no→GOTO Action 270; False positive detected, do not activate HMI-apparatus 200 automatically or optionally if HMI-apparatus manually activated or already activated, do not show Dleft or Dright depths.

In the presently described embodiment, the control unit 160 is configured to take a slightly conservative approach and rather than activate the HMI-display and populate with a high-depth (800 mm), the system 180 is configured to not take any action. Over time, as the bush 60 is passed the detected water at wading depth will give rise to a positive decision to automatically activate the HMI-apparatus 200. Additionally, it will be recognised, that in reality, water tends to be entered gradually and the water level relative to the vehicle 110 will rise gradually and smoothly. Water is less likely to suddenly appear at a depth of 500 mm without there first having been indications of water present as detected by the remote surface sensors 116a, 116b; and at threshold wading depth (optionally 450 mm) by the water-contact sensors 30a, 30b, 30c, 30d. Therefore, the depicted scenario is perhaps a rare scenario, in which the analysed data indicates an unusual situation, an interference object 60 is present, the surface 70 is not water and the wade-assisting apparatus is stalled from being activated by the system 180 until the bush 60 has been passed at which time, the vehicle 110 will be in a FIG. 1 scenario, and the HMI-apparatus 200 automatically activated. In other envisaged embodiments, the action 270 may be replaced with an action to display the lower of the two depths, in this case Dright.

With reference to the scenario illustrated in FIG. 3D, the system 180 of the present embodiment, using the algorithm as illustrated in FIG. 4 and described above will make the following determinations:

Question 201: yes→GOTO question 202a;
Question 202a: yes→GOTO question 204;
Question 204: yes→GOTO question 205;
Question 205: yes→GOTO question 206;
Question 206: yes→GOTO question 207;
Question 207: no→Action 270: False positive detected, do not activate the HMI-apparatus 200 automatically or optionally if HMI-apparatus manually activated or already activated, do not show Dleft or Dright depths.

The control unit 160 configured as schematically illustrated in the embodiment of FIG. 4 is able to identify that a scenario, such as that illustrated in FIG. 3D contains an anomaly, the interference object 72 and that the HMI-apparatus 200 should not be activated or if activated not necessarily display an average of the depths or only show the lower depth. It will be recognised that the algorithm to identify false positives may be imparted into other aspects of the control unit's 160 programming for example into a program to determine what information an HMI-apparatus 200 should convey. Such a program or algorithm may be called once the HMI-apparatus has been activated (either manually or automatically—though different algorithms may optionally but preferably apply to whether the HMI-apparatus 200 was activated manually or automatically). Such a program may influence the information that is displayed to prevent a false depth measurement from being displayed. In such an algorithm, in one envisaged embodiment, a determination may be made to show only the lower depth Dright, it being identified that the left depth Dleft comprises an anomaly.

Referring now to FIGS. 5, 6 and 7 there are shown additional or alternative embodiments of algorithms or programs for a control unit 160. In FIGS. 5, 6 and 7, like numerals have, where possible, been used to denote like parts, albeit with the addition of the prefix "300", "400", and "500" to indicate that these features belong to the alternative embodiments respectively. In view of certain similarities, only the different decisions and actions will be described in detail.

In FIG. 5 an additional algorithm 3000 is depicted schematically. In this embodiment of the system 180, the in-car HMI-apparatus 200 is activated (and deactivated) manually by a user. In a system 180 where manual activation/deactivation of the HMI-apparatus is permitted special consideration needs to be given to the information that the HMI-apparatus 200 is populated with. This is because the HMI-apparatus 180 may be activated manually before any water-contact sensor 30a, 30b, 30c, 30d detects the presence of water. The following decisions are taken in each numbered box in the flowchart of FIG. 5:

351: Provide information, optionally regarding: the fact that vehicle 110 is wading; the estimated wading depth; and/or the approximate distance to the maximum wading depth of the vehicle 110, via the HMI-apparatus 200.

353: Provide information, specifically, the depth estimation from the data issued by the "down-hill" remote sensor 116a, 116b. In other words display only the depth Dleft or Dright estimated from the sensor 116a, 116b that is disposed with the angle of roll αR. If the angle αR indicates vehicle 110 roll to the vehicle's right (from the point of view of the driver), then Dright is displayed. Conversely, if the angle αR indicates vehicle roll to the vehicle's left (from the point of view of the driver), then Dleft is displayed.

371: Do not provide information via the HMI-apparatus 200, optionally regarding: the fact that vehicle 110 is wading; the estimated wading depth; and/or the approximate distance to the maximum wading depth of the vehicle 110. Optionally display a blank screen, issue no warning beeps or if the HMI-apparatus 200 can accommodate it, display a status message such as "acquiring data"; "current depth unavailable" or other holding message until the situation that has given rise to the detected "false-positive" scenario has passed.

301: Is water presence detected (optionally at threshold wading depth)?

Is one or more of the front or rear contact sensors (30a, 30b, 30c, 30d; rear contact sensors not illustrated) indicating submersion in water?

302a: Is surface is detected above a contact sensor when water is detected?

Is Left-side estimated depth (Dleft) and/or the Right-side estimated depth (Dright) greater than the height of any contact sensor issuing a positive in-water signal, giving consideration to the ride height/suspension setting of the vehicle, (for the vehicle 110 illustrated the mounting height of the sensors 30a, 30b, 30c, 30d in normal ride-height is 450 mm)?

302b: Is a surface detected above threshold wading depth when water is not detected?

Is Left-side estimated depth (Dleft) and/or the Right-side estimated depth (Dright) greater than the height of any contact sensor, giving consideration to the ride height/suspension setting of the vehicle, (for the vehicle 110 illustrated the mounting height of the sensors 30a, 30b, 30c, 30d in normal ride-height is 450 mm)?

303: Is a low surface detected?

Is the Left mirror sensor depth (Dleft) and/or the Right mirror sensor depth (Dright) measured within a specified and calibrateable range? (For example, between about 125 mm and about 450 mm or alternatively between about 250 mm and about 450 mm). In this embodiment the calibrateable range is 250 mm to 450 mm. (The calibrateable range may optionally correspond to a depth range below which, for a given vehicle 110, it has been determined that any water/surface is too low in depth to need to alert and/or caution the driver, and/or is likely to correspond to an interference object at this height, for example grass, rut in off-road terrain and therefore according to an optional aspect of the invention any surface detected in this low-calibrateable range will not give rise to activation or display of information of the HMI-apparatus (200). However, it should be noted that once an HMI-apparatus 200 is already activated, estimated water depths in this low-calibrateable range may be displayed on the HMI-apparatus.

304: Are the water depth estimations Dright, Dleft asymmetric?

Is the Left mirror sensor measured depth (Dleft) different to the Right mirror sensor measured depth (Dright), optionally giving consideration to a tolerance ΔT in each estimation, further optionally of say ±100 mm? In other words, is the water depth measurement asymmetric, allowing for ΔT? (|Dleft−Dright|>ΔT).

305: Is the vehicle on a lateral gradient ($a_R$)?

With reference to the scenario illustrated in FIG. 3B, the system 180 of the vehicle 110, using the algorithm 3000 as illustrated in FIG. 5 and described above will make the following determinations:

Question 301: no→GOTO Question 304;
Question 304: no→GOTO Question 302b;
Question 302b: yes→Action 371: Do not provide information.

Again, an algorithm 3000 of an optional embodiment of the invention serves to eliminate providing false data on a wade-assisting HMI-apparatus 200, even when the manual mode of operation has been utilised.

With reference to the scenario illustrated in FIG. 3C, the system 180 of the vehicle 110, using the algorithm 3000 as illustrated in FIG. 5 and described above will make the following determinations:

Question 301: yes→GOTO question 302a;
Question 302a: yes→GOTO question 304;
Question 304: yes (Dleft 800 mm and Dright 500 mm)→GOTO 305;
Question 305: no→GOTO Action 371; False positive detected, do not populate manually activated HMI-apparatus 200.

Optionally display a blank screen, issue no warning beeps or if the HMI-apparatus 200 can accommodate it, display a status message such as "acquiring data"; "current depth unavailable" or other holding message until the situation that has given rise to the detected "false-positive" scenario has passed.

With reference to the scenario illustrated in FIG. 3D, the system 180 of the present embodiment, using the algorithm 3000 as illustrated in FIG. 5 and described above will make the following determinations:

Question 301: yes→GOTO question 302a;
Question 302a: yes→GOTO question 304;
Question 304: yes→GOTO question 305;
Question 305: yes→Action 353: Provide information, specifically, the depth estimation from the data issued by the "down-hill" remote sensor 116b.

Having identified an anomaly in relation to the left depth estimation Dleft, the control unit 160 may be configured in this manual-HMI activated mode to display the information relating to the right depth estimation. It is known with confidence that water is present because of the positive indication from the contact-sensors 30a, 30b, 30c and 30d therefore although a false positive has been identified, it is desirable to still provide useful information via the HMI-apparatus 200 and inform the driver of the Dright depth since this has been established, through the interrogation carried out by the control unit 160, that water of depth Dright is disposed about the vehicle. The vehicle's attitude is known and in certain envisaged embodiments, where the HMI-apparatus is a display screen, the attitude and relative position of the water may be illustrated graphically/schematically (see FIG. 2).

In yet a further envisaged embodiment of algorithm for a control unit 160 of the system 180, an algorithm 4000 or program is provided that supports only automatic activation and operation of the HMI-apparatus 200. Manual activation/deactivation is not supported. The algorithm 4000 is shown schematically in FIG. 6, wherein the following decisions and actions are mapped out in order to interrogate the data (a) to (h) provided to the control unit 160.

454: Display message to demonstrate that HMI-apparatus is operational without providing depth estimation since threshold wading depth not reached. For example, display "System Active: Alert Depth not Reached".

455: Display the greater of the Dleft and Dright depth estimations based upon the remote sensor 116a, 116b data.

456: Display the lower of the Dleft and Dright depth estimations based upon the remote sensor 116a, 116b data.

453: Provide information, specifically, the depth estimation from the data issued by the "down-hill" remote sensor 116a, 116b. In other words display only the depth Dleft or Dright estimated from the sensor 116a, 116b that is disposed with the angle of roll αR. If the angle αR indicates vehicle 110 roll to the vehicle's right (from the point of view of the driver), then Dright is displayed. Conversely, if the angle αR indicates vehicle roll to the vehicle's left (from the point of view of the driver), then Dleft is displayed.

401: Is water presence detected (optionally at threshold wading depth)?

Is one or more of the front or rear contact sensors (30a, 30b, 30c, 30d; rear contact sensors not illustrated) indicating submersion in water?

404: Are the water depth estimations Dright, Dleft asymmetric?

Is the Left mirror sensor measured depth different to the Right mirror sensor measured depth, optionally giving consideration to a tolerance ΔT in each estimation, further optionally of say ±100 mm? In other words, is the water depth measurement asymmetric, allowing for ΔT? (|Dleft−Dright|>ΔT).

405: Is the vehicle on a lateral gradient ($α_R$)?

410: Has any of the water contact sensors 301, 30b, 30c, 30d been submerged in water within the pre-determined time period?

Optionally the predetermined time period may be about 30 s. In other embodiments of the invention, the pre-determined time limit is greater or shorter than 30 s. Further optionally, the pre-determined time limit may be between about 15 s and about 45 s. The pre-determined time limit may be a variable and may be calibrateable, optionally by a user and/or optionally by the algorithm 4000 when running on the control unit 160 in response to the environment of travel of the vehicle 110. For example, if two wading events have recently occurred close to one another, the predetermined time limit may be increased in anticipation that the vehicle 110 may soon enter another wading event. The predetermined time limit may be set similarly to or in proportion with the time difference between the immediately preceding wading event and the wading event immediately prior to that one.

411: Is Dleft or Dright>an "alert depth"?

Optionally the alert depth may be the same as the threshold wading depth, optionally and as per the present arrangement however, the "alert depth" is less than the threshold wading depth and may optionally be about 350 mm.

With reference to the scenario illustrated in FIG. 3D, the system 180 of FIG. 1, using the algorithm 4000 as illustrated in FIG. 6 and described above will make the following determinations:

Question 401: yes→GOTO 404;
Question 404: no→GOTO 405;
Question 405: yes→Action 471: Provide information, specifically, the depth estimation from the data issued by the "down-hill" remote sensor 116a, 116b.

In yet a further envisaged embodiment of algorithm for a control unit 160 of the system 180, an algorithm 5000 or program is provided for determining when to automatically deactivate the HMI-apparatus 200. As such the algorithm to be described with reference to FIG. 7 may be used in combination with any algorithm, program or other software configured to automatically activate the HMI-apparatus. And following automatic activation, in one optional arrangement, the control unit 160 will be configured to work through the sequence of decisions shown in FIG. 7 in order to determine whether the HMI-apparatus 200 should automatically be deactivated. In envisaged embodiments, an algorithm 5000 for exiting the HMI-apparatus 200 may additionally or alternatively provide for a suspension of the HMI-apparatus wherein a display screen may be on, not populated with wade aid information, but listing a holding message, for example "wade-assistance suspended". This may allow the system 180 to quickly re-activate an HMI-apparatus display screen so that wade-assistance information can be displayed again quickly. Such a suspend mode deployed in any one or a combination of the following vehicle scenarios:

Terrain mode set to OFF-ROAD;

Vehicle drive speed within predetermined low ranged (for example less than about 5 kmph or less than about 18 kmph);

Last wading event exited within a pre-determined time lime (for example 3 minutes); and Navigation system or vehicle wheel articulation or selection of low-range for example, indicative of terrain and/or specific feature where wading event likely (for example, a ford lies ahead within a certain [re-defined distance, optionally say about 1 to about 2 km; or vehicle wheel articulation indicates roughness of terrain).

The algorithm 5000 is shown schematically in FIG. 7, wherein the following decisions and actions are mapped out in order to interrogate the data (a) to (h) provided to the control unit 160.

571: Deactivate the HMI-apparatus. In other words, do not provide any wade-assisting information via the HMI-apparatus 200

530: Has user manually selected HMI-apparatus 200 deactivation?

501: Is water presence detected (optionally at threshold wading depth)?

Is one or more of the front or rear contact sensors (30a, 30b, 30c, 30d; rear contact sensors not illustrated) indicating submersion in water?

532: Is vehicle travelling in forward direction?

534a: Is vehicle travelling nose up?

534b: Is vehicle travelling nose down?

The purpose of steps 532, 534a, and 534b is to determine whether the vehicle is moving up-hill such that the gradient of the ground might be appropriate for exiting a wading situation. Alternatively, questions 534a, 534b could be rephrased as is the vehicle travelling on a longitudinal gradient with the vehicle directed up the incline?

536: Is Dleft and/or Dright reducing? Optionally this may be determined by comparing a current data value for each of Dleft and Dright with one or more preceding values of Dleft and Dright respectively.

538: Has the minimum depth been reached? Optionally the minimum depth may defined as: minimum depth<threshold wading depth; further optionally the minimum depth may be defined as: minimum depth<threshold wading depth–c, wherein c may optionally be about 100 mm. It will be understood that other appropriate values for setting a minimum depth may be used to determine whether the vehicle 110 has exited a wading event.

540: Has the depth (Dleft and/or Dright) been less than or equal to the minimum depth for a required time period? Optionally the required time period may be about 30 s. In other envisaged embodiments, the minimum depth may be about 10 s to about 120 s.

As can be seen from the optional sequence of the optional decisions set-out above, an embodiment for an exit strategy for a control unit 160 for controlling the operation of an HMI-apparatus 200 is described. In other embodiments, further single overriding factors (similar to has user deactivated HMI-apparatus 200 manually?) may be included, for example, has vehicle speed exceeded a threshold speed (optionally about 5 kmph); has user deactivated OFF-ROAD terrain mode?

It will be understood that the precise questions and precise sequential order of the questions or decisions set-out in FIGS. 4, 5, 6 and 7 may be altered to suit any of: system design; to include consideration of other data; to accommodate programming languages; to include further interrogation steps; providing that to do so would not adversely affect the outcome, for example by causing a false positive depth measurement to be displayed by an HMI-device without appropriate caution.

It can be appreciated that various changes may be made within the scope of the present invention, for example, in other embodiments of the invention it is envisaged that data from one or more rear mounted water-contact sensors will be used provided to the control unit. In other envisaged embodiments of the invention, the system comprises at least one under-vehicle-body-mounted-ranging and/or contact sensor. In yet further envisaged embodiments, the system comprises two under-vehicle-body mounted-ranging and/or contact sensors, one mounted toward the front of the vehicle 110 and one mounted toward the rear of the vehicle 110, (as described in GB1204594.4). Optionally, the two under-vehicle-body mounted-ranging and/or contact sensors may be disposed on the same notional longitudinal axis of the vehicle 110.

Further optionally, any contact sensor may be mounted at an elevation on the vehicle that is less than, equal to or greater than the wading threshold depth at a given ride height. A sequence of contact sensors may be provided at different vehicle elevations corresponding to the same wading depth threshold but at different vehicle ride heights (the lowermost mounted corresponding to wading depth threshold at maximum vehicle ride height).

The remote ranging sensors are preferably provided in pairs, but one or more remote ranging sensor may be provided that is not on the same lateral axis as any other remote ranging sensor. Alternatively only pairs of remote ranging sensors on the same lateral axis are provided in other embodiments. One or more remote ranging sensors may be deployable, optionally upon detection of wading by a contact sensor at threshold wading depth height.

Optionally, an under-body mounted sensor may be located on or adjacent the exhaust system of the vehicle 110.

In envisaged embodiments, any or each of the remote and/or contact sensors may be operated intermittently or continuously. The data received by the control unit of the system may be time-averaged and then analysed in order to make a determination as to whether the vehicle may be about to enter into a wading event. The system and the sensors comprised in the system are optionally continuously active when the vehicle electrical system is activated (typically when the vehicle ignition key is "on"), but may be de-activated and re-activated on demand by the vehicle driver. Alternatively, the sensors of the system may be intermittently active. Additionally or alternatively, data from each of any of the sensors may be stored and analysed over time to improve the confidence with which the system determines that a vehicle is possibly going to enter in a wading event.

The system may monitor the sensor(s) signal overtime to distinguish from splashing. Any suitable time-averaging functions may be used to filter data signals received from the or each sensor of the system The system may have memory for storing historical data for reference in reaching a positive determination.

It should be noted that where reference is made to activating the HMI apparatus, this may also be referred to as providing wading information on the HMI-apparatus. Similarly, where reference is made to deactivating or not activating the HMI apparatus, this may also be referred to as not providing wading information on the HMI-apparatus.

The invention claimed is:

1. A method of controlling an HMI-apparatus for providing wading information to a driver of a vehicle, the method comprising:
    processing information received from two or more remote-ranging sensors into data relating to the depth of water about the vehicle, wherein the two or more remote-ranging sensors are disposed above the surface of the water and at an elevation greater than a threshold wading depth of the vehicle; and
    selectively controlling the HMI-apparatus to display the wading information in dependence on the data.

2. A method of controlling an HMI-apparatus, according to claim 1 comprising an additional step of determining whether at least part of the vehicle is disposed in water at the threshold wading depth of the vehicle based upon data provided by one or more water-contact sensors and wherein the additional step is carried out before or after the processing step.

3. A method of controlling an HMI-apparatus according to claim 2 wherein said data is left-side depth (Dleft) estimation and right-side depth (Dright) estimation.

4. A method of controlling an HMI-apparatus according to claim 3 wherein the processing step further comprises any one or a combination of:
    a) determining if the left-side depth estimation and/or right-side depth estimation is greater than the threshold wading depth when it has been determined that water is present at least at the threshold wading depth by any of said one or more water-contact sensors;
    b) determining if the left-side depth estimation and/or right-side depth estimation is greater than the threshold wading depth when it has not been determined that water is present at least at the threshold wading depth by any of said one or more water-contact sensors;
    c) determining if the left-side depth estimation and/or the right-side depth estimation is within the low-calibrate-able-range; and
    d) determining if the left-side depth estimation and the right-side depth estimation are within a predetermined tolerance ($\Delta T$) of one another.

5. A method of controlling an HMI-apparatus according to claim 4 wherein upon determining at step (a) that neither the left-side depth nor the right-side depth is greater than the threshold wading depth, the step of selectively controlling the HMI-apparatus comprises operating the HMI-apparatus without displaying the wading information.

6. A method of controlling an HMI-apparatus according to claim 4 wherein upon determining at step (b) that either the left-side depth or the right-side depth is greater than the threshold wading depth and at the same time that no contact sensor has issued data indicating that water is present at the threshold wading depth, the step of selectively controlling the HMI-apparatus comprises operating the HMI-apparatus without displaying the wading information.

7. A method of controlling an HMI-apparatus according to claim 4 wherein upon determining at step (c) that both the left-side depth and the right-side depth are below the lower limit of the low-calibrateable range, the step of selectively controlling the HMI-apparatus comprises operating the HMI-apparatus without displaying the wading information.

8. A method of controlling an HMI-apparatus according to claim 4, wherein upon determining at step (d) that the left-side depth estimation and the right-side depth estimation are within the predetermined tolerance ($\Delta T$) of one another, the method further comprises checking a lateral gradient of the vehicle and if the lateral gradient is non-zero the step of selectively controlling the HMI-apparatus comprises operating the HMI-apparatus without displaying the wading information.

9. A method according to claim 4, wherein:
    the low-calibrateable-range is in the range of about 125 mm and about 450 mm;
    the predetermined tolerance ($\Delta T$) is between about 50 mm and about 150 mm; and/or
    the upper limit of the low-calibrateable-range is provided by the threshold wading depth.

10. A method according to claim 1 wherein the threshold wading depth is between about 200 mm and about 450 mm.

11. A method of controlling an HMI-apparatus according to claim 1, the method comprising one or more of:
    (i) determining if a threshold vehicle speed has been exceeded;

(ii) determining if any of one or more contact-water sensors has not detected water at threshold wading depth within a first predetermined time period;
(iii) determining if a vehicle is driving up-hill;
(iv) determining if the depth of a body of water about the vehicle has reduced to a minimum depth; and
(v) determining if a user has requested manual deactivation of the HMI-apparatus; and
in response to any one or more of steps (i) through (v), the step of selectively controlling the HMI-apparatus comprises operating the HMI-apparatus without displaying the wading information.

12. A method according to claim 11 wherein:
the first predetermined time period is at least 15 seconds;
the minimum depth is less than the threshold wading depth; and/or
the threshold wading depth is about 450 mm and the minimum depth is about 350 mm.

13. A vehicle comprising a system for wade-assisting, the system comprising two or more remote ranging sensors disposed at an elevation above a wading depth threshold of the vehicle; at least one water-contact sensor disposed at an elevation above the wading depth threshold different than the first elevation; an HMI-apparatus; and a control unit coupled to each of the two or more remote ranging sensors, to the at least one water-contact sensor and to the HMI-apparatus, wherein the control unit is configured to carry out the method of claim 1.

14. A method of controlling an HMI-apparatus according to claim 1 wherein the information received from the two or more remote-ranging sensors is obtained by the two or more remote-ranging sensors remotely and without the two or more remote-ranging sensors contacting the water.

15. A method of controlling an HMI-apparatus according to claim 4, wherein upon determining at step (d) that the left-side depth estimation and right-side depth estimation are not within the predetermined tolerance (ΔT) of one another, the method further comprises checking a lateral gradient of the vehicle and if the lateral gradient is zero, the method further comprises carrying out at least one of the following steps:
carrying out the step of selectively controlling the HMI-apparatus by operating the HMI-apparatus without displaying the wading information; or
modifying the wading information to show only the depth information corresponding to the remote ranging sensor angled with the lateral gradient.

16. A system for a vehicle, the system comprising:
two or more remote ranging sensors disposed on the vehicle at an elevation above a wading depth threshold of the vehicle;
an HMI apparatus configured to display wading information; and
a controller arranged to process information received from the two or more remote ranging sensors into data relating to the depth of the water about the vehicle, wherein the two or more remote ranging sensors are disposed above the surface of the water, and to control the HMI apparatus to selectively provide the wading information in dependence on the data.

17. A system for a vehicle as claimed in claim 16, the system further comprising at least one water-contact sensor disposed at or below the wading depth threshold, and wherein the control means is further arranged to determining if the at least one water-contact sensor is disposed in water and to further selectively provide the wading information in dependence on the determination.

18. A system for a vehicle as claimed in claim 16, wherein the two or more remote ranging sensors are disposed on the same lateral axis of the vehicle.

19. A system for a vehicle as claimed in claim 16, the system further comprising a vehicle attitude sensor, and wherein the control means is further arranged to detect the attitude of the vehicle and to further selectively provide the wading information in dependence on the detection.

20. A vehicle comprising the system as claimed in claim 16.

21. A method of controlling an HMI-apparatus for providing information to the driver of a vehicle, the method comprising:
processing information received from two or more remote-ranging sensors into data relating to the depth of water about the vehicle, which two or more remote ranging sensors are disposed: on the same lateral axis of the vehicle;
at an elevation greater than a threshold wading depth of the vehicle; and above the surface of the water; and
selectively activating the HMI-apparatus, deactivating the HMI-apparatus or maintaining a current display mode of the HMI-apparatus in dependence on said data.

* * * * *